(12) United States Patent
Jensen et al.

(10) Patent No.: US 9,181,866 B2
(45) Date of Patent: Nov. 10, 2015

(54) ENERGY RECOVERY AND COOLING SYSTEM FOR HYBRID MACHINE POWERTRAIN

(71) Applicant: Caterpillar Inc., Peoria, IL (US)

(72) Inventors: Jeffrey E. Jensen, Dunlap, IL (US);
William R. Tinker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 201 days.

(21) Appl. No.: 13/924,006

(22) Filed: Jun. 21, 2013

(65) Prior Publication Data

US 2014/0373533 A1    Dec. 25, 2014

(51) Int. Cl.
| | |
|---|---|
| *F02B 33/44* | (2006.01) |
| *F02B 63/04* | (2006.01) |
| *B60W 10/00* | (2006.01) |
| *F02G 5/02* | (2006.01) |
| *F01K 15/02* | (2006.01) |

(Continued)

(52) U.S. Cl.
CPC ............... *F02B 63/04* (2013.01); *B60W 10/00* (2013.01); *F01K 15/02* (2013.01); *F01K 23/065* (2013.01); *F01K 27/02* (2013.01); *F02G 5/02* (2013.01); *F22B 1/1807* (2013.01); *F22B 1/28* (2013.01); *Y10S 903/93* (2013.01)

(58) Field of Classification Search
CPC ........ B60W 10/00; F01K 23/02; F02B 63/04; F02G 5/02; Y10S 903/93
USPC ............................... 60/39.6–39.63, 597–624; 123/559.1–566, 200–249
See application file for complete search history.

(56) References Cited

U.S. PATENT DOCUMENTS

| | | |
|---|---|---|
| 3,919,839 A | 11/1975 | Aguet |
| 4,267,692 A | 5/1981 | Earnest |

(Continued)

FOREIGN PATENT DOCUMENTS

WO    2012159830 A1    11/2012

OTHER PUBLICATIONS

Publisher: Massachusetts Institute of Technology (http://web.mit.edu/16.unified/www/SPRING/propulsion/); Author: Professor Z. S. Spakovszky; Title: 16.Unified: Thermodynamics and Propulsion; Relevant Pages of Publication: 8.5 Rankine Power Cycles, pp. 1-3; Date: 2009; Place of Publication: http://web.mit.edu/16.unified/www/Spring/propulsion/notes/node65.html.

(Continued)

*Primary Examiner* — Jesse Bogue
(74) *Attorney, Agent, or Firm* — Will Tinker; Finnegan, Henderson, Farabow, Garrett & Dunner, LLP

(57) ABSTRACT

An energy recovery and cooling system for a hybrid machine is disclosed. The energy recovery and cooling system can include at least one circuit including at least one pump, at least one condenser, and at least one turbine, as well as a first flow path and a second flow path. The first flow path can be connected in fluid communication with the at least one pump, the at least one condenser, and the at least one turbine. The first flow path can additionally be in thermal communication with at least one internal combustion energy system component of the hybrid machine. The second flow path can be connected in fluid communication with the at least one pump, the at least one condenser, and the at least one turbine. The second flow path can additionally be in thermal communication with at least one electrical energy system component of the hybrid machine.

5 Claims, 10 Drawing Sheets

(51) Int. Cl.
*F01K 23/06* (2006.01)
*F01K 27/02* (2006.01)
*F22B 1/18* (2006.01)
*F22B 1/28* (2006.01)

(56) References Cited

U.S. PATENT DOCUMENTS

| | | | |
|---|---|---|---|
| 4,276,747 A | | 7/1981 | Faldella et al. |
| 4,586,338 A | | 5/1986 | Barrett et al. |
| 4,901,531 A | | 2/1990 | Kubo et al. |
| 5,176,000 A | * | 1/1993 | Dauksis ............ 60/618 |
| 6,910,333 B2 | | 6/2005 | Minemi et al. |
| 7,654,250 B2 | | 2/2010 | Fujinuma et al. |
| 7,665,304 B2 | | 2/2010 | Sundel |
| 7,690,213 B2 | | 4/2010 | Inaba |
| 7,730,723 B2 | | 6/2010 | Yaguchi et al. |
| 7,950,481 B2 | | 5/2011 | Betz et al. |
| 8,037,956 B2 | | 10/2011 | Noguchi et al. |
| 8,061,139 B2 | | 11/2011 | Bronicki |
| 2008/0041046 A1 | * | 2/2008 | Bering ............ 60/320 |
| 2009/0205892 A1 | | 8/2009 | Jensen et al. |
| 2010/0283262 A1 | * | 11/2010 | Jensen et al. ......... 290/1 R |
| 2010/0319346 A1 | * | 12/2010 | Ast et al. ............ 60/616 |
| 2010/0326076 A1 | * | 12/2010 | Ast et al. ............ 60/671 |
| 2011/0072816 A1 | | 3/2011 | Ernst et al. |
| 2011/0094227 A1 | * | 4/2011 | Ast et al. ............ 60/671 |
| 2011/0220729 A1 | * | 9/2011 | Bucknell ............ 237/12.3 R |
| 2011/0295453 A1 | | 12/2011 | Betz et al. |
| 2012/0019010 A1 | * | 1/2012 | Nakamura et al. ........... 290/1 R |
| 2012/0125002 A1 | * | 5/2012 | Lehar et al. ............ 60/645 |
| 2013/0219882 A1 | | 8/2013 | Jensen |

OTHER PUBLICATIONS

Publisher: Massachusetts Institute of Technology (http://web.mit.edu/16.unified/www/SPRING/propulsion/); Author: Professor Z. S. Spakovszky; Title: 16.Unified: Thermodynamics and Propulsion; Relevant Pages of Publication: 8.6 Enhancements of, and Effect of Design Parameters on, Rankine Cycles, pp. 1-4; Date: 2009; Place of Publication: http://web.mit.edu/16.unified/www/SPRING/propulsion/notes/node66.html.

Publisher: Mid-Michigan SAE (http://www.midmichigansae.org/); Author: Dr. James Gover; Title: A Tutorial on Hybrid Electric Vehicles: EV, HEV, PHEV and FCEV; Relevant Pages of Publication: 4-13, 25, 30, 35, 41 & 42; Date: Apr. 20, 2009; Place of Publication: SAE Mid-Michigan Meeting Presentation, Kettering University—Flint http://www.midmichigansae.org/documents/DrGoverPresentationSAEApril20.pdf.

Publisher: Wikipedia, The free encyclopedia; Author: Wikipedia, the free encyclopedia; Title: Hybrid vehicle drivetrain Relevant Pages of Publication: 1-10; Date: Apr. 22, 2013; Place of Publication: http://en.wikipedia.org/wiki/Hybrid_vehicle_drivetrain.

Publisher: Analog Devices, Inc.; Author: Jeff Watson and Gustavo Castro; Title: High-Temperature Electronics Pose Design and Reliability Challenges; Relevant pp. Of Publication: 1-7; Date: Apr. 2012; Place of Publication: Analog Dialogue vol. 46-04 (http://www.analog.com/library/analogdialogue/archives/46-04/high_temp_electronics.pdf).

* cited by examiner

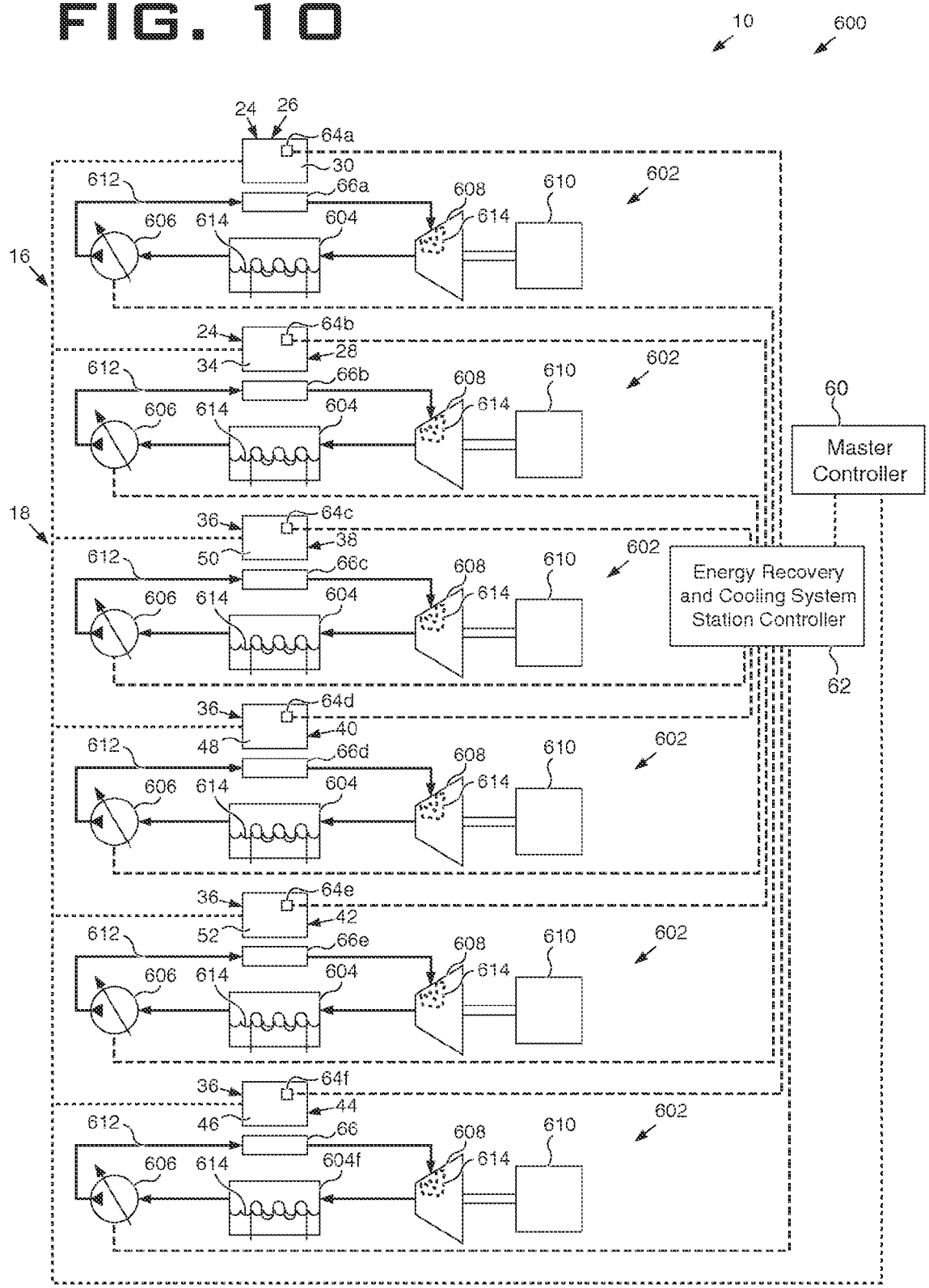

ENERGY RECOVERY AND COOLING SYSTEM FOR HYBRID MACHINE POWERTRAIN

TECHNICAL FIELD

The present disclosure is directed to an energy recovery and cooling system and, more particularly, to an energy recovery and cooling system for a hybrid machine.

BACKGROUND

Hybrid machines and vehicles may include an internal combustion engine in addition to electrical energy power, storage and drive components which may work independently, simultaneously, cooperatively, and/or integrally to supply power to a drive system to propel the machine. Although such hybrid propulsion machines and vehicles may provide reduced emissions and higher fuel economy in comparison to traditional machines and vehicles powered exclusively by an internal combustion engine, hybrid vehicles and machines may present a variety of limitations, drawbacks, and challenges. In particular, hybrid vehicles and propulsion machines may be characterized by higher costs and complexity. In addition, although hybrid machines and vehicles may provide reduced emissions and higher fuel economy in comparison to traditional machines and vehicles powered exclusively by an internal combustion engine, the operation of many hybrid machines and vehicles nonetheless may utilize an internal combustion engine, and thus may at least in part be dependent upon the consumption and combustion of fuels such as fossil fuels, as well as the attendant constraints and inefficiencies related thereto. Furthermore, the practical and widespread utilization and implementation of hybrid technology as well as demands for increased efficiency, power output, and/or operational features and functionalities may be confounded by various limitations of the systems and components of existing hybrid machines.

U.S. Pat. No. 5,176,000 (the '000 patent) to Dauksis, discloses a hybrid internal combustion engine and electrical motor ground vehicle propulsion system. In the system, a fluid is first heated in an internal combustion engine cylinder water jacket and then converted to its gaseous phase in a double walled manifold enshrouding the exhaust manifold. The gas then turns a turbine, exits to a condenser where the gas is condensed to a liquid, and then the fluid is returned to a radiator to await the next cycle. The turbine is rotatably connected to a generator which produces electrical energy when the turbine turns. This electrical energy is used to charge a bank of batteries. The bank of batteries is used to supply an electrical motor which may be used as a complimentary or alternate source of propulsion for a ground vehicle.

The present disclosure is directed to mitigating or eliminating one or more of the drawbacks discussed above.

SUMMARY

One aspect of the present disclosure is directed to an energy recovery and cooling system for a hybrid machine. The energy recovery and cooling system can include at least one circuit including at least one pump, at least one condenser, and at least one turbine, as well as a first flow path and a second flow path. The first flow path can be connected in fluid communication with the at least one pump, the at least one condenser, and the at least one turbine. The first flow path can additionally be in thermal communication with at least one internal combustion energy system component of the hybrid machine. The second flow path can be connected in fluid communication with the at least one pump, the at least one condenser, and the at least one turbine. The second flow path can additionally be in thermal communication with at least one electrical energy system component of the hybrid machine.

Another aspect of the present disclosure is directed to an energy recovery and cooling system for a hybrid machine. The energy recovery and cooling system can include an energy recovery and cooling circuit including an internal combustion energy system circuit and an electrical energy system circuit. The internal combustion energy system circuit can include a first pump, a first condenser, a first turbine, and an internal combustion energy system flow path. The internal combustion energy system flow path can be connected in fluid communication with the first pump, the first condenser, and the first turbine. The internal combustion energy system flow path can be in thermal communication with one or more internal combustion energy system components of the hybrid machine. The electrical energy system circuit can include a second pump, a second condenser, a second turbine, and an electrical energy system flow path. The electrical energy system flow path can be connected in fluid communication with the second pump, the second condenser, and the second turbine. The electrical energy system flow path can be in thermal communication with one or more electrical energy system components of the hybrid machine. Yet another aspect of the present disclosure is directed to an energy recovery and cooling system for a hybrid machine. The energy recovery and cooling system can include an energy recovery and cooling circuit including a turbine, a condenser, and a pump and one or more flow paths. The one or more flow paths can be connected in fluid communication with the turbine, the condenser, and the pump. The one or more flow paths can also be in thermal communication with one or more internal combustion energy system components of the hybrid machine and in thermal communication with one or more one or more electrical energy system components of the hybrid machine. The one or more flow paths can be configured to selectively direct a working fluid of the energy recovery and cooling circuit in thermal communication with the one or more internal combustion energy system components of the hybrid machine and the one or more electrical energy system components of the hybrid machine.

BRIEF DESCRIPTION OF THE DRAWINGS

FIG. 10 is a schematic and diagrammatic illustration of another embodiment of the exemplary disclosed energy recovery and cooling system for the hybrid powertrain of the hybrid machine illustrated in FIG. 1.

DETAILED DESCRIPTION

Figure 1:
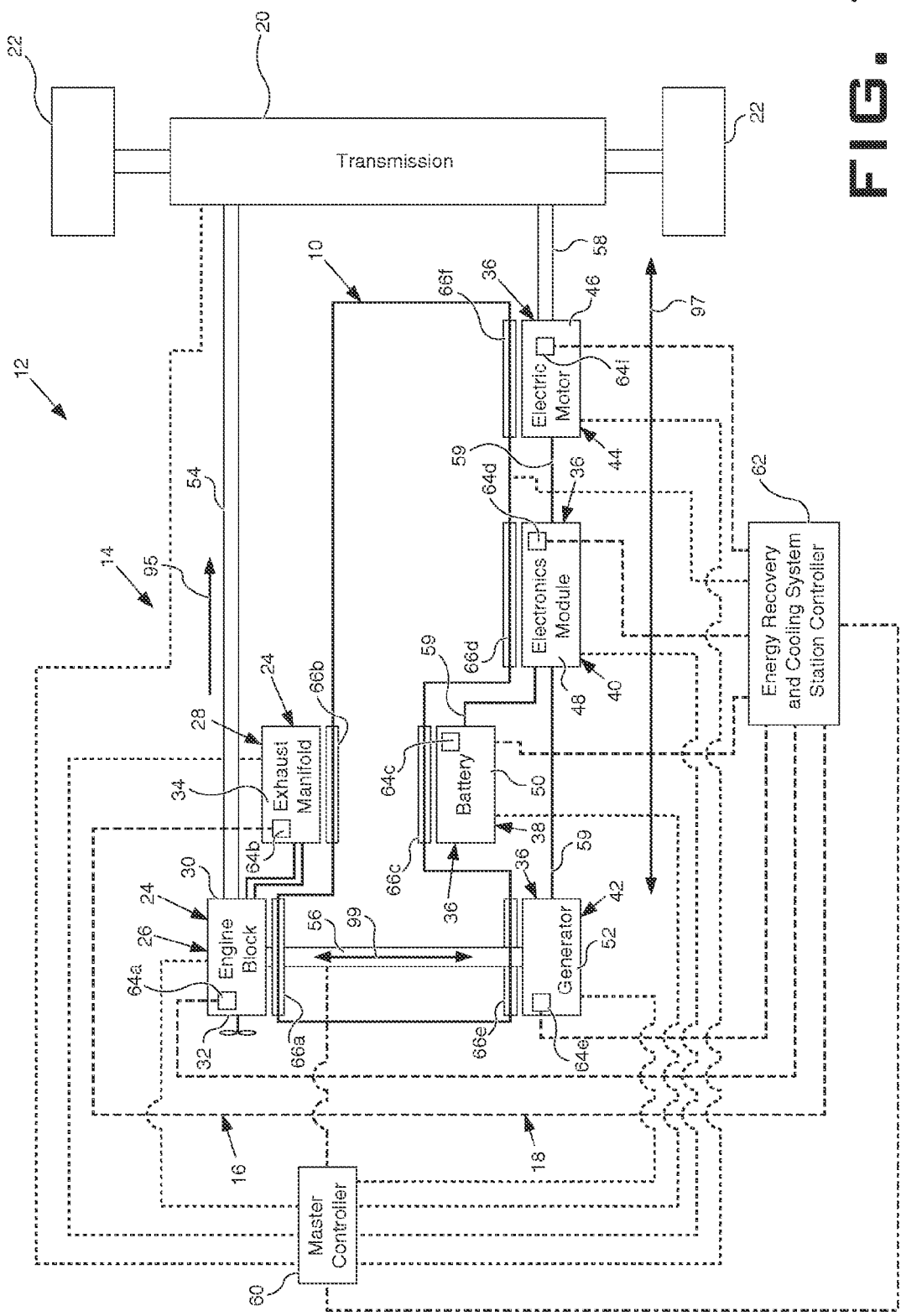
FIG. 1 is a schematic and diagrammatic illustration of an exemplary hybrid powertrain of a hybrid machine including an exemplary disclosed energy recovery and cooling system.

Reference will now be made in detail to specific embodiments or features, examples of which are illustrated in the accompanying drawings. Generally, corresponding or similar reference numbers will be used, when possible, throughout the drawings to refer to the same or corresponding parts. Elements in schematics, included in the drawings, and described herein, may not be drawn with dimensions or to any realistic scale, but may rather be drawn to illustrate different aspects of the disclosure.

The present disclosure is directed to an energy recovery and cooling system 10 which can be implemented and utilized as an energy recovery and cooling system for a hybrid machine. In particular, the presently disclosed energy recovery and cooling system 10 can be implemented and utilized with any of a variety of powertrains or similar power systems of any of a variety of hybrid machines in which an energy recovery and cooling system consistent with any one or more of the embodiments disclosed herein can be employed.

For the purposes of providing one example of an operational application and implementation of the present disclosure, FIG. 1 shows a hybrid machine 12 within the context of a mobile hybrid electric machine which can incorporate and utilize an energy recovery and cooling system 10 consistent with any one or more of the embodiments as disclosed herein and illustrated in more detail in the exemplary embodiments shown in FIGS. 2-10. However, without departing from the spirit and scope of the present disclosure, the presently disclosed hybrid machine 12 can be embodied as any type of mobile or fixed machine which utilizes an internal combustion energy system as well as one or more additional energy systems, which can include electrical energy systems, to individually and/or concertedly store, generate, convert, transmit and/or supply energy, including but not limited to automobiles, heavy trucks, busses, and other heavy highway vehicles, construction, forestry, mining, agricultural, and industrial machines including but not limited to heavy off-highway construction trucks, mining trucks, articulated trucks, dozers, compactors, drag lines, excavators, loaders, scrapers, graders, and the like, railway locomotives, marine vessels, aircraft, and fixed or stationary machines such as an electrical generators or industrial power generation systems.

As illustrated in the exemplary embodiment shown in FIG. 1, the hybrid machine 12 can include a hybrid powertrain 14, which can include, at least in part, an internal combustion energy system 16 and an electrical energy system 18. The hybrid powertrain 14 can also include a transmission (or gearbox) 20 mechanically and operatively coupled to transmit mechanical power or energy between the internal combustion energy system 16 and/or electrical energy system 18, and one or more propulsion elements 22, which can be wheels, tracks, propellers, turbines, or any other known means of propulsion. The hybrid powertrain 14, as well as the internal combustion energy system 16, electrical energy system 18, and transmission 20 thereof can additionally include mechanical elements including but not limited to shafts, linkages, clutches, brakes, gears, differentials, and the like as well as electrical elements such as terminals, harnesses, wiring or any other suitable electrical connections which can enable the internal combustion energy system 16 and the electrical energy system 18 to individually and/or concertedly interact to transmit energy between the energy systems and, in the exemplary embodiment shown in FIG. 1, propulsion elements 22.

As further shown in the exemplary illustrated in FIG. 1 as well as FIGS. 2-10, the internal combustion energy system 16 can include, in part, one or more, or a plurality of internal combustion energy system components 24 which may generate heat and/or require cooling, including, for the purposes of illustration, a first internal combustion energy system component 26 and a second internal combustion energy system component 28. In one embodiment, the one or more internal combustion energy system components 24 can include an engine block or engine jacket as well as any included, attached, and/or additional components which may generate heat and/or require cooling, illustrated generally and schematically in FIGS. 1-10 as engine block 30 of an internal combustion engine 32 and an exhaust manifold 34. The internal combustion engine 32 can be a diesel engine, a gasoline engine, a natural gas engine, a gas turbine engine, or any other engine which can produce mechanical energy from the combustion of a combustible medium.

For the purposes of illustration and by way of example and not limitation, in FIG. 1 as well as FIGS. 2-10 the engine block 30 is designated and shown as the first internal combustion energy system component 26 and the exhaust manifold 34 is designated and shown as the second internal combustion energy system component 28. However, such designations are arbitrary and for the purposes of illustration, as any one of the engine block 30 or the exhaust manifold 34 can be designated as any one of the first internal combustion energy system component 26 or the second internal combustion energy system component 28. Furthermore, and without departing from the spirit and scope of the present disclosure, the internal combustion energy system 16 can include additional and/or alternative internal combustion energy system components 24 or combinations thereof, and any one or any plurality or combination of an engine block 30, an exhaust manifold 34, any other type of engine cooling system, engine exhaust system, and/or mechanical system generating heat through friction can be designated as any one of the first internal combustion energy system component 26, the second internal combustion energy system component 28, or any additional one or more internal combustion energy system components 24. In yet another alternative, the internal combustion energy system 16 can include only a single first internal combustion energy system component 26, which can be an engine block 30, an exhaust manifold 34, a combination thereof, or any one of the additional foregoing internal combustion energy system components 24.

The electrical energy system 18 can also include, in part, a plurality of electrical energy system components 36 which may generate heat and/or require cooling, including, for the purposes of illustration, a first electrical energy system component 38, a second electrical energy system component 40, a third electrical energy system component 42, and, in one embodiment, a fourth electrical energy system component 44. In one embodiment, the electrical energy system components 36 can include any one or more or a combination of one or more electrical motors (illustrated in FIGS. 1-10 as electrical motor 46), one or more electronics modules (illustrated in FIGS. 1-10 as electronics module 48), one or more energy storage devices such as a battery or battery pack (illustrated in FIGS. 1-10 as battery 50), and one or more generators (illustrated in FIGS. 1-10 as generator 52). One or more of the electronics modules 48 can include one or more or a combination of power electronics modules, devices and components, including but not limited to a power converter, power inverter, rectifier, retarder module/resistor grid, and each of which can include one or more or a combination of electrical circuits/printed circuit boards, capacitors, drivers, controllers (such as electric motor and generator drivers & controllers), choppers, and/or semiconductors/switching elements, and the like. As such, in the schematic depictions shown in FIGS. 1-10, electronics module 48 can represent more than one electronics module such as, for example, two or more electronics modules and any of the foregoing modules, devices and components thereof and can be electrically connected via terminals, harnesses, and any other necessary internal and external electrical wiring and connections. In a like manner, in the schematic depictions of electrical motor 46, battery 50, and/or generator 52 shown in FIGS. 1-10 can represent more than one of such electrical energy system components such as, for example, two or more electric motors, batteries or battery packs, and/or generators, respectively.

For the purposes of illustration and by way of example and not limitation, in FIG. 1 as well as FIGS. 2-10, battery 50 is designated and shown as the first electrical energy system component 38, electronics module 48 is designated and shown as the second electrical energy system component 40, generator 52 is designated and shown as the third electrical energy system component 42, and electrical motor 46 is designated and shown as the fourth electrical energy system component 44. However, such designations are arbitrary and for the purposes of illustration, as any one of the battery 50, electronics module 48, generator 52, or electrical motor 46 can be designated as any one the first, second, third, or fourth electrical energy system component 38, 40, 42, 44. In addition, or alternatively, the electrical energy system 18 can include fewer, additional and/or alternative electrical energy system components 36 and combinations thereof. For example, and without departing from the spirit and scope of the present disclosure, the electrical energy system 18 can include a first, a second, and a third electrical energy system component 38, 40, 42, or a first through fourth and additional electrical energy system components 38, 40, 42, 44, 36, wherein any one or more of which can be designated to define the electrical energy system 18 as including a variety of different possible combinations of one or more electrical motors 46, electronics modules 48, batteries 50, and/or generators 52, and the like.

The hybrid powertrain 14 can also include any of a variety of different types of architectures and/or operative configurations, each of which may include any of a variety of operation modes, energy paths and associated mechanical and electrical connections between a variety of different types of internal combustion energy system components 24 and electrical energy system components 36 such as any one or more of those as discussed above, depending upon numerous factors including but not limited to the specific application, conditions and/or environment for which the hybrid machine 12 is being utilized as well as any needs, features, and/or functionalities specific thereto. In the exemplary embodiment shown in FIG. 1, an internal combustion output shaft 54 can mechanically and rotatably couple the internal combustion engine 32 to the transmission (or gearbox) 20 to transmit mechanical energy therebetween. In one embodiment, the operable connection between the internal combustion engine 32, internal combustion output shaft 54, and transmission 20 can include one or more clutches (not shown) to engage or disengage the path and transmission of mechanical energy between the internal combustion engine 32 and the transmission 20. Additionally, the internal combustion engine 32 can be operably and mechanically coupled to the generator 52, and the electric motor 46 can be operably and mechanically coupled to the transmission 20, respectively, via a generator shaft 56 and an electrical motor shaft 58, respectively, wherein each connection and shaft can include one or more clutches (not shown) to engage or disengage the respective paths and transmissions of mechanical energy therebetween. Finally, each of the foregoing electrical energy system components 36 can be connected to transmit electrical energy therebetween via a plurality of electrical connection elements 59, which can include any one or more of terminals, harnesses, wiring, and the like.

As provided by the foregoing discussion and as further discussed herein, by way of example and not limitation, the hybrid machine 12 shown in the exemplary embodiment of FIG. 1 is depicted as including a power split or series-parallel hybrid powertrain 14 configuration to illustrate that the hybrid machine 12, and hybrid powertrain 14 thereof, can include a plurality of operation modes, energy paths and associated mechanical and electrical connections between the foregoing components of the hybrid powertrain 14. Notwithstanding, numerous additional hybrid powertrain 14 configurations are contemplated without departing from the spirit and scope of the present disclosure, wherein in one example, the internal combustion output shaft 54 can be disengaged or alternatively eliminated such that the hybrid machine 12 can be operated or configured to include a series hybrid powertrain 14 configuration. In another example, the generator shaft 56 can be disengaged or alternatively eliminated such that the hybrid machine 12 can be operated or configured to include a parallel hybrid powertrain 14 configuration.

As illustrated by the exemplary embodiment shown in FIG. 1, the hybrid machine 12 can also include a master controller 60 which can be electronically and controllably connected to each of the first and second internal combustion energy system components 26, 28, as well as the first, second, third, and fourth electrical energy system components 38, 40, 42, 44, in addition to any of various sensors, such as speed, temperature or control sensors and/or any drivers and/or electronic controllers operatively associated with the foregoing components. Additionally, and as shown in FIG. 1, master controller 60 can also be electronically and controllably connected to the transmission (or gear box) 20, the internal combustion output shaft 54, the generator shaft 56 and the electrical motor shaft 58, as well as any included and/or additional mechanical elements including but not limited to shafts, linkages, clutches, brakes, gears, and/or differentials of the hybrid powertrain 14 and machine 12, in addition to any sensors such as speed, position, or acceleration sensors associated therewith. As such, the master controller 60 can be configured to electronically monitor and control any one or more of the actuation and operation of as well as the connections, functional interactions, operation modes, and/or the division and path of energy between the internal combustion energy system 16 (and components 24 thereof), the electrical energy system 18

(and components 36 thereof), the transmission (or gearbox) 20 and/or the additional components of the hybrid powertrain 14.

As illustrated in FIG. 1 and further shown in FIGS. 2-10, the energy recovery and cooling system 10 of the hybrid machine 12 can include an energy recovery and cooling system controller 62, which can be connected in electronic communication to the master controller 60 as well as each of the internal combustion energy system components 24 and the electrical energy system components 36. In particular, the first internal combustion energy system component 26, designated for the purposes of illustration as engine block 30, can include a temperature sensor 64a and a heat exchanger 66a, and the second internal combustion energy system component 28, designated for the purposes of illustration as exhaust manifold 34, can include a temperature sensor 64b and a heat exchanger 66b. Additionally, each of the first, second, third, and fourth electrical energy system components 38, 40, 42, 44, designated for the purposes of illustration as battery 50, electronics module 48, generator 52, and electric motor 46, respectively, can include a temperature sensor 64c, 64d, 64e, 64f, respectively, and a heat exchanger 66c, 66d, 66e, 66f, wherein temperature sensors 64a-64f and heat exchangers 66a-66f as provided above are referred to generally and/or collectively as "temperature sensor(s) 64" and "heat exchanger(s) 66", respectively. The energy recovery and cooling system controller 62, can be connected in electronic communication to each of the foregoing temperature sensors 64 to monitor and/or receive signals indicative of the operation temperature of each of the above internal combustion engine components 24 and the electrical energy system components 36. Additionally each of the heat exchangers 66 can include and/or be embodied as any suitable heat exchange and/or recovery unit, jacket or other similar device or component attached, connected, or otherwise positioned in thermal proximity and communication with the foregoing first and second internal combustion energy system components 26, 28 and the first, second, third, and fourth electrical energy system components 38, 40, 42, 44, as provided above, and configured facilitate thermal communication between the flow path of the working fluid of the energy recovery and cooling system 10 and each of the foregoing components of the internal combustion energy system 16 and the electrical energy system 18, consistent with and as illustrated in the exemplary embodiments of the energy recovery and cooling system 10 of the present disclosure shown in FIGS. 2-10 and further discussed herein. As provided above and further discussed below, the energy recovery and cooling system controller 62 can also be connected in electronic communication to the master controller 60 to monitor and/or receive signals from the master controller 60 indicative of the monitoring, actuation, control and/or operation of any one or more of the internal combustion energy system components 24 and the electrical energy system components 36 and/or the connections, functional interactions, operation modes, and/or the division and path of energy between the foregoing components of the hybrid powertrain.

Figure 2:
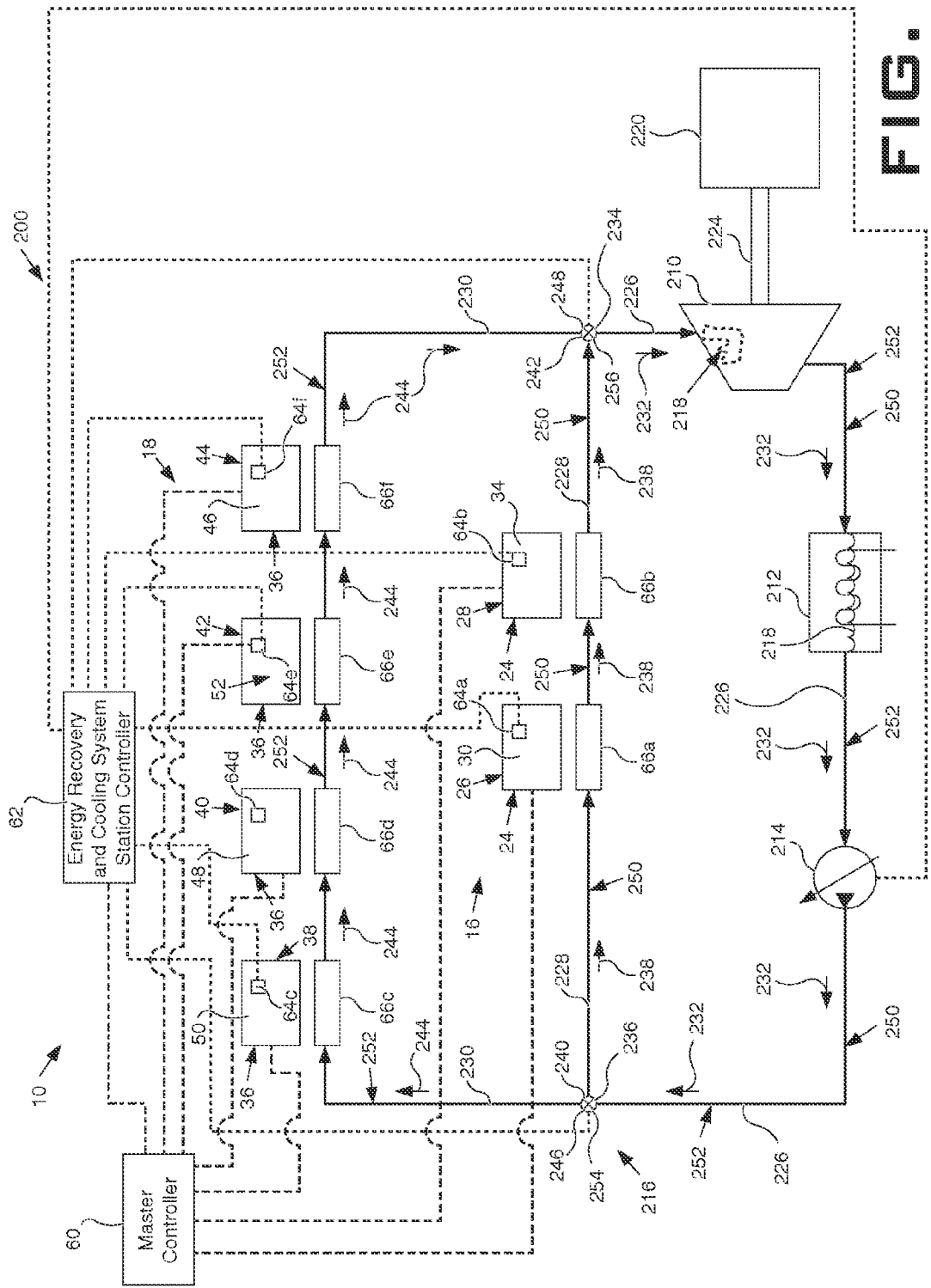
FIG. 2 is a schematic and diagrammatic illustration of one embodiment of the exemplary disclosed energy recovery and cooling system for the hybrid powertrain of the hybrid machine illustrated in FIG. 1.

FIGS. 2-10 illustrate exemplary embodiments of the energy recovery and cooling system 10 of the present disclosure implemented and utilized as an energy recovery and cooling system for the hybrid powertrain 14 of the hybrid machine 12 as discussed above, and illustrate additional detail of the energy recovery and cooling system 10 over what is shown in FIG. 1. In particular, the energy recovery and cooling system 200 of FIG. 2 illustrates one embodiment of the energy recovery and cooling system 10 for the hybrid powertrain 14 of the hybrid machine 12 illustrated in FIG. 1.

As shown in FIG. 2, the energy recovery and cooling system 200 can include a turbine 210, a condenser 212 and a pump 214, each operably connected in fluid communication and fluidly integrated into an energy recovery and cooling circuit 216 to operatively interact with working fluid 218 contained therein. For the purposes of the present embodiment as well as the additional embodiments as disclosed herein, working fluid 218 (as well as the first working fluid 314, second working fluid 326, and working fluid 412, 512, 614 first working fluid and second working fluid as disclosed herein) can be defined as any type of fluid used for cooling or for powering a turbine, such as water/steam, air, or common fluids. The turbine 210 can be operably and mechanically connected to a power component 220, which can be via an output shaft 224. The turbine 210 of the present embodiment (as well as first turbine 308, second turbine 320, high pressure turbine 352, 364, 414, low pressure turbine 354, 366, 416, first turbine 516, second turbine 518, turbine 608 of the additional embodiments as disclosed herein), can be any rotary mechanical device that can be configured to extract energy from the working fluid 218 within the energy recovery and cooling circuit 216. The present power component 220 as well as each of power components 332, 420, 522, 610 as further disclosed herein, can be configured to convert the mechanical energy created by the rotation of a turbine (or a turbine assemblies, discussed herein) into electrical energy. In one embodiment, the power component 220 can be an electric generator, which, in one example, can be electrically connected to one or more batteries for charging. Alternatively, the power component 220 can be a driveshaft, a condenser fan, an engine-generator or combined electrical generator and engine, or any other component or device configured to convert mechanical energy to electrical energy, generate electrical energy from a mechanical input, and/or drive other machine components directly.

The energy recovery and cooling circuit 216 of the exemplary energy recovery and cooling system 200 can be embodied as a single, fluidly integrated closed loop circuit including a plurality of conduits and can be configured to direct the working fluid 218 of the energy recovery and cooling circuit 216 along and through multiple circuits including separate flow paths. In particular, in one embodiment, the energy recovery and cooling circuit 216 can include a first or energy recovery and fluid delivery conduit 226, a second or internal combustion energy system conduit 228, and a third or electrical energy system conduit 230. The energy recovery and fluid delivery conduit 226 can be configured to fluidly direct the working fluid 218 of the energy recovery and cooling circuit 216 along a first or energy recovery and fluid delivery flow path 232 which can extend from a first or upstream end 234 to a second or downstream end 236 of the energy recovery and fluid delivery conduit 226. Additionally, the energy recovery and fluid delivery conduit 226 can be fluidly connected to direct the energy recovery and fluid delivery flow path 232 of working fluid 218 sequentially and successively through the turbine 210, which can be fluidly integrated and positioned downstream of the upstream end 234 of the energy recovery and fluid delivery conduit 226, through the condenser 212, which can be fluidly connected via the energy recovery and fluid delivery conduit 226 and positioned downstream of the turbine 210, and through the pump 214, which can be fluidly connected to (via the energy recovery and fluid delivery conduit 226) and positioned downstream of the condenser 212 and can be operable to pressurize and propel the working fluid 218 through the energy recovery and fluid delivery conduit 226 as well as the additional conduits and flow paths included within the energy recovery and cooling circuit 216.

The second or internal combustion energy system conduit 228 can be configured to fluidly direct the working fluid 218 of the energy recovery and cooling circuit 216 along a second or internal combustion energy system flow path 238 which can extend from a first or upstream end 240 to a second or downstream end 242 of the internal combustion energy system conduit 228. The internal combustion energy system conduit 228 and internal combustion energy system flow path 238 can be arranged, routed and/or positioned to direct the working fluid 218 of the energy recovery and cooling circuit 216 sequentially and successively adjacent to, along and/or through or otherwise in thermal proximity and communication with each of the individual internal combustion energy system components 24, which can be via the associated heat exchangers 66a and 66b, such that the working fluid 218 successively gains thermal energy, and in one embodiment, can cool, each individual internal combustion energy system component 24 as the working fluid 218 passes in thermal proximity and communication therewith.

As illustrated in the exemplary embodiment shown in FIG. 2, the first internal combustion energy system component 26 (and, in one example, the heat exchanger 66a thereof) can be positioned along the internal combustion energy system conduit 228 and flow path 238 thereof upstream of the second internal combustion energy system component 28 (and, in one example, the heat exchanger 66b thereof). As provided above and shown in the exemplary embodiment of FIG. 2, for the purposes of illustration, the engine block 30 is shown as the first internal combustion energy system component 26 and the exhaust manifold 34 is shown as the second internal combustion energy system component 28. However, the normal operating temperature, heat production, and/or the cooling demands of any one or more of the internal combustion energy system components 24 (as well as the electrical energy system components 36) can be affected and/or defined by numerous factors including but not limited to the architecture or configuration of the hybrid powertrain 14 and/or operation modes, activation, control, operative interactions, and/or the division and/or path of energy between the internal combustion energy system components 24 and electrical energy system components included 36 therein. As a result, the downstream-most or second internal combustion energy system component 28 can be any internal combustion energy system component 24, including but not limited to the engine block 30 or exhaust manifold 34, which can have a normal operating temperature equal to or higher than that of the upstream first internal combustion energy system component 26, which can be any other internal combustion energy system component 24 including but not limited to an exhaust manifold 34 or engine block 30, based upon/defined by the foregoing factors as provided above, such that as the working fluid 218 passes along and through the internal combustion energy system conduit 228 and flow path 238 thereof and exchanges thermal energy with each of the individual internal combustion energy system components 24, the working fluid 218 may successively gain thermal energy.

The third or electrical energy system conduit 230 can be configured to fluidly direct the working fluid 218 of the energy recovery and cooling circuit 216 along a third or electrical energy system flow path 244 which can extend from a first or upstream end 246 to a second or downstream end 248 of the electrical energy system conduit 230. The electrical energy system conduit 230 and electrical energy system flow path 244 can be arranged, routed and/or positioned to direct the working fluid 218 of the energy recovery and cooling circuit 216 sequentially and successively adjacent to, along and/or through or otherwise in thermal proximity and communication with each of the individual electrical energy system components 36, which can be via the associated heat exchangers 66c, 66d, 66e, 66f, such that the working fluid 218 successively gains thermal energy, and in one embodiment, can cool, each individual electrical energy system component 36 as the working fluid 218 passes in thermal proximity and communication therewith.

As illustrated in the exemplary embodiment shown in FIG. 2, the first, second, and third electrical energy system components 38, 40, 42 (and, in one example, the heat exchangers 66c, 66d, 66e, respectively, thereof) can be positioned along the electrical energy system conduit 230 and flow path 244 thereof upstream of the second, third, and fourth electrical energy system components 40, 42, 44, (and, in one example, the heat exchangers 66d, 66e, 66f, respectively, thereof), respectively. As additionally shown in the exemplary embodiment shown in FIG. 2 and provided above, for the purposes of illustration, battery 50 is shown as the first electrical energy system component 38, electronics module 48 is shown as the second electrical energy system component 40, generator 52 is shown as the third electrical energy system component 42, and electrical motor 46 is shown as the fourth electrical energy system component 44. However, the normal operating temperature, heat production, and/or the cooling demands of any one or more of the electrical energy system components 36 can be affected and/or defined by the numerous factors as provided above. As a result, and consistent with the foregoing, each downstream electrical energy system component 36, such as the second, third, and fourth electrical energy system components 40, 42, 44, respectively, can be any electrical energy system component 36, including but not limited to battery 50, electronics module 48, generator 52 or electrical motor 46, which can have a normal operating temperature equal to or higher than that of any and/or each upstream electrical energy system component 36, such as the respective upstream first, second, and third electrical energy system components 38, 40, 42, which can be any other electrical energy system component 36 including but not limited to battery 50, electronics module 48, generator 52 or electrical motor 46, based upon/defined by the foregoing factors as provided above such that as the working fluid 218 passes along and through the electrical energy system conduit 230 and flow path 244 thereof and exchanges thermal energy with each of the electrical energy system components 36, the working fluid 218 may successively gain thermal energy.

As provided above, the energy recovery and cooling circuit 216 can be embodied as a single, closed loop circuit and can be configured to direct working fluid 218 along and through multiple circuits, which can include an internal combustion energy system circuit 250 and an electrical energy system circuit 252. In particular, the downstream end 236 of the energy recovery and fluid delivery conduit 226 can be connected in fluid communication to the upstream end 240 of the internal combustion energy system conduit 228 as well as the upstream end 246 of the electrical energy system conduit 230, wherein a first valve 254 can be fluidly attached therebetween. The first valve 254 can be a flow control valve or any other valve or fluid control device which can be operable to selectively and fluidly direct the working fluid 218 of the energy recovery and cooling circuit 216 from the downstream end 236 of the energy recovery and fluid delivery conduit 226 and flow path 232 thereof into and through either the internal combustion energy system conduit 228 or the electrical energy system conduit 230. Additionally, the downstream ends 242, 248, respectively, of each of the internal combustion energy system conduit 228 and the electrical energy system conduit 230 can be connected in fluid communication with the upstream end 234 of the energy recovery and fluid delivery conduit 226, wherein a second valve 256, can be fluidly attached therebetween. The second valve 256 can similarly be a flow control valve or any other fluid control device which can be operable to selectively direct the working fluid 218 of the energy recovery and cooling circuit 216 fluidly communicated to the downstream end 242 of the internal combustion energy system conduit 228, or the downstream end 248 of the electrical energy system conduit 230, into the upstream end 234 and through the energy recovery and fluid delivery conduit 226.

With this configuration, the internal combustion energy system circuit 250 can include and can be defined by the path of working fluid 218 of the energy recovery and cooling circuit 216 flowing along the energy recovery and fluid delivery flow path 232 and the internal combustion energy system flow path 238, through the energy recovery and fluid delivery conduit 226 and the internal combustion energy system conduit 228, respectively, and the electrical energy system circuit 252 can include and can be defined by the path of working fluid 218 of the energy recovery and cooling circuit 216 flowing along the energy recovery and fluid delivery flow path 232 and the electrical energy system flow path 244, through the energy recovery and fluid delivery conduit 226 and the electrical energy system conduit 230, respectively. Furthermore, the energy recovery and cooling system 200 of the present embodiment can be configured to switch the path of working fluid 218 between the internal combustion energy system circuit 250 and the electrical energy system circuit 252, which in one embodiment can be via the energy recovery and cooling system controller 62.

In particular, and consistent with the disclosure provided above, the energy recovery and cooling system controller 62 can be connected in electronic communication to monitor, and/or receive signals from temperature sensors 64 each operatively associated with each of the foregoing internal combustion energy system components 24 and the electrical energy system components 36, and additionally can be connected in electronic communication to the master controller 60 to monitor and/or receive signals indicative of the monitoring, actuation, control and/or operation of the foregoing components and those of the hybrid powertrain 14. The energy recovery and cooling system controller 62 can additionally be electronically connected to monitor, actuate, and/or control one or more or a plurality of the components, fluid connections, the temperature and flow of working fluid 218, as well as the exchange of thermal energy, extraction of heat, cooling, and/or generation of energy of, by and within the energy recovery and cooling system 200. In particular, in one embodiment, the energy recovery and cooling system controller 62 can be electronically and controllably connected to each of the first valve 254 and the second valve 256, wherein in one example, the first valve 254 and the second valve 256 can each be an electronically actuated flow control valve. Furthermore, the energy recovery and cooling system controller 62 can be electronically and controllably connected to the pump 214, which can be an electronically controllable pump, and in one example, can additionally be an electronically controllable variable displacement pump. With this operable configuration, the energy recovery and cooling system controller 62 can be configured, in part, to switch the path of working fluid 218 of the energy recovery and cooling circuit 216 between the internal combustion energy system circuit 250 and the electrical energy system circuit 252 to route and direct the working fluid 218 to exchange thermal energy, cool, and generate energy from either the internal combustion energy system components 24 or the electrical energy system components 36 in response to any one or more of the operating temperature, heat production, and/or the cooling demands of any one or more of the internal combustion energy system components 24 and/or electrical energy system components as 36 well as any one or more of the activation, control, and/or operation of the internal combustion energy system 16, the electrical energy system 18, and/or the additional components of the hybrid powertrain 14.

Specifically, in one embodiment, the energy recovery and cooling system controller 62 may receive one or more or a combination of electronically monitored readings or transmitted signals including but not limited to one or more high or increasing temperature readings or signals from the temperature sensors 64, such as temperature sensors 64a and/or 64b, of any one or more of the internal combustion energy system components 24 including but not limited to the engine block 30 and/or exhaust manifold 34, and/or one or more low or decreasing temperature readings or signals from any one or more or any combination of temperature sensors 64c, 64d, 64e and/or 64f of any one or more of the electrical energy system components 36, including but not limited to the battery 50, electronics module 48, generator 52 and/or electrical motor 46. Additionally, or alternatively, the energy recovery and cooling system controller 62 may receive one or more electronically monitored readings or transmitted signals indicative of the activation and/or increased intensity of operation or actuation of any one or more of the foregoing internal combustion energy system components 24, and/or the deactivation or decreased intensity of operation or actuation of any one or more of the foregoing electrical energy system components 36, from or in response to the master controller's 60 signals monitoring and/or controlling the hybrid powertrain 14, as provided above. In response to any one or more or a combination of these signals, the energy recovery and cooling circuit 216 may be actuated by the energy recovery and cooling system controller 62 to switch the path of working fluid 218 to the internal combustion energy circuit 250 such that the working fluid 218 is fluidly routed and directed to exchange thermal energy, extract heat, cool, and generate energy from the internal combustion energy system components 24.

In particular, and in response to any one or more or a combination of the signals as discussed above, the energy recovery and cooling system controller 62 may transmit an electronic internal combustion energy system circuit activation signal to the first valve 254 and the second valve 256. In response, the first valve 254 may be actuated to direct the flow of working fluid 218, which may be at a first temperature (T1) and condensed into a liquid state via the heat exchange within the condenser 212 and subsequently pressurized and fluidly communicated to the downstream end 236 of the energy recovery and fluid delivery conduit 226 via the operation of the pump 214, into the upstream end 240 of the internal combustion energy system conduit 228 and along the flow path 238 thereof. As the working fluid 218 is fluidly communicated to flow through the internal combustion energy system conduit 228, the working fluid 218 may sequentially and successively exchange heat with, cool, and gain thermal energy from the first internal combustion energy system component 26 (which may be any one of the engine block 30 or the exhaust manifold 34) and subsequently from the second internal combustion energy system component 28 (which may be any other of the engine block 30 or the exhaust manifold 34) such that the working fluid 218 may successively gain thermal energy and may be heated from the first temperature (T1) to an elevated, higher second temperature (T2) to a vapor (whereas T2>T1) upon passing the higher temperature, second (or downstream-most) internal combustion energy system component 28. Additionally, in response to the electronic internal combustion energy system circuit activation signal from the energy recovery and cooling system controller 62, the second valve 256 may be actuated to direct the flow of working fluid 218 from the downstream end 242 of the internal combustion energy system conduit 228 into the upstream end 234 of the energy recovery and fluid delivery conduit 226.

The working fluid 218, which may be heated to the second temperature (T2) and in vapor phase, may next be fluidly communicated through the energy recovery and fluid delivery conduit 226 which may fluidly direct the working fluid 218 from the upstream end 234 thereof into the turbine 210, wherein expansion of the vapor phase working fluid 218 through the turbine 210 may generate mechanical energy via the resultant rotation thereof, which may be mechanically transmitted via the output shaft 224 to the power component 220 and converted to electrical energy. Upon leaving the turbine 210, the working fluid 218, which may be substantially at the first temperature (T1) and at a reduced quality wherein a portion of which may be condensed, may be fluidly communicated through the energy recovery and fluid delivery conduit 226 along the flow path 232 thereof and directed into and through the condenser 212 and condensed to a liquid via heat extraction and subsequently to the downstream-most pump 214 and pressurized. Thereafter, the working fluid 218 may continue to be fluidly directed along the internal combustion energy system circuit 216 for another cycle of thermal energy exchange, cooling, energy generation, heat extraction, and pressurization as provided above.

The energy recovery and cooling system controller 62 may alternatively receive one or more or a combination of electronically monitored readings or transmitted signals including but not limited to one or more high or increasing temperature readings or signals from any one or more or any combination of the temperature sensors 64c, 64d, 64e and/or 64f of any one or more or a combination of the electrical energy system components 36, including but not limited to the battery 50, electronics module 48, generator 52 and/or electrical motor 46 and/or one or more low or decreasing temperature readings or signals from the temperature sensors 64 such as 64a and/or 64b of any one or more of the internal combustion energy system components 24 including but not limited to the engine block 30 and/or exhaust manifold 34. Additionally, or alternatively, the energy recovery and cooling system controller 62 may receive one or more electronically monitored readings or transmitted signals indicative of the activation and/or increased intensity of operation or actuation of any one or more of the foregoing electrical energy system components 36 and/or the deactivation or decreased intensity of operation or actuation of any one or more of the foregoing internal combustion energy system components 24 from or in response to the master controller's 60 signals monitoring and/or controlling the hybrid powertrain 14. In response to any one or more or a combination of these signals, the energy recovery and cooling circuit 216 may be actuated by the energy recovery and cooling system controller 62 to switch the path of working fluid 218 to the electrical energy system circuit 252 such that the working fluid 218 is fluidly routed and directed to exchange thermal energy, extract heat, cool, and generate energy from the foregoing electrical energy system components 36.

In particular, and in response to any one or more or a combination of the signals as discussed above, the energy recovery and cooling system controller 62 may electronically transmit an electrical energy system circuit activation signal to the first valve 254 and the second valve 256. In response, the first valve 254 may be actuated to direct the flow of working fluid 218, which may be at a first temperature (T1) and condensed into a liquid state, from the downstream end 236 of the energy recovery and fluid delivery conduit 226 into the upstream end 246 of the electrical energy system conduit 230 and along the electrical energy system flow path 244. As the working fluid 218 is fluidly communicated to flow through the electrical energy system conduit 230, the working fluid 218 may be directed to sequentially and successively exchange heat with, cool, and gain thermal energy from each of the first, second, third, and fourth electrical energy system components 38, 40, 42, 44 (each of which may be any one of the battery 50, electronics module 48, generator 52 or electrical motor 46) such that the working fluid 218 may successively gain thermal energy and may be heated to an elevated, higher second temperature (T2) to a vapor. Consistent with the first valve 254 as provided above, in response to the electronically transmitted electrical energy system circuit activation signal from the energy recovery and cooling system controller 62, the second valve 256 may be actuated to direct the flow of working fluid 218 from the downstream end 248 of the electrical energy system conduit 230 into the upstream end 234 of the energy recovery and fluid delivery conduit 226.

The working fluid 218, which may be heated to the second temperature (T2) and in vapor phase, may next be fluidly directed from the upstream end 234 of the energy recovery and fluid delivery conduit 226 into the turbine 210, wherein expansion of the vapor phase working fluid 218 through the turbine 210 may generate mechanical energy which may be mechanically transmitted to the power component 220 and converted to electrical energy. Upon leaving the turbine, the working fluid 218, which may be substantially at the first temperature (T1) and at a reduced quality wherein a portion of which may be condensed, may be delivered to the condenser 212 and condensed to a liquid. Thereafter, the working fluid 218 may be pressurized via the pump 214 and may continue to be fluidly directed along the electrical energy system circuit 252 for another cycle of thermal energy exchange, cooling, energy generation, heat extraction, and pressurization as provided above.

Figure 3:
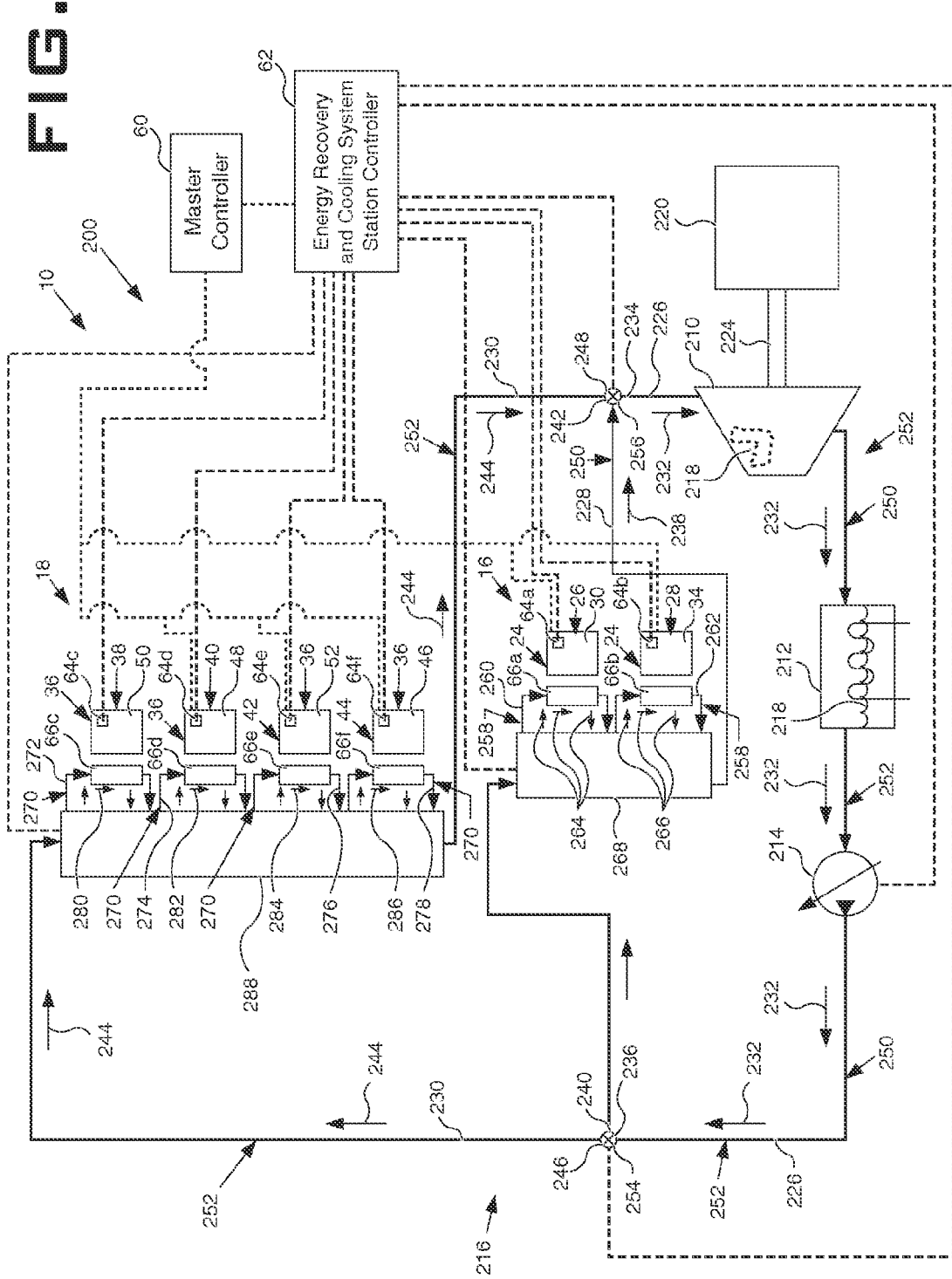
FIG. 3 is a schematic and diagrammatic illustration of an alternate embodiment of the exemplary disclosed energy recovery and cooling system illustrated in FIG. 2.

FIG. 3 illustrates an alternate embodiment or variant of the energy recovery and cooling system 200, and energy recovery and cooling circuit 216 thereof shown in FIG. 2. In particular, the alternate embodiment shown in FIG. 3 is directed to the energy recovery and cooling system 200 as illustrated in FIG. 2 and discussed above, wherein the internal combustion energy system circuit 250 and the electrical energy system circuit 252 thereof are additionally configured to controllably, selectively and/or sequentially direct the flow of working fluid 218 to exchange thermal energy, extract heat, cool, and generate energy from each, any one or more and/or or any combination and sequence of the individual internal combustion energy system components 24 and the individual electrical energy system components 36, respectively.

As illustrated by the exemplary embodiment shown in FIG. 3, the internal combustion energy system conduit 228 can include a plurality of internal combustion energy system component conduits 258, each connected in fluid communication with the internal combustion energy system flow path 238 between the upstream end 240 and downstream end 242 of the internal combustion energy system conduit 226 and positioned to extend adjacent to, along and/or through or otherwise in thermal proximity and communication with each of the individual internal combustion energy system components 24 which may generate heat and/or require cooling. In particular, the internal combustion energy system component conduits 258 can include a first internal combustion energy system component conduit 260 and a second combustion energy system component conduit 262. The first internal combustion energy system component conduit 260 can fluidly direct working fluid 218 along a first internal combustion energy system component flow path 264 such that the working fluid 218 fluidly communicated therethrough can exchange thermal energy with the first internal combustion energy system component 26, which in one embodiment, can be via a heat exchanger 66a. Similarly, the second internal combustion energy system component conduit 262 can fluidly communicate working fluid 218 along a second internal combustion energy system component flow path 266 such that the working fluid 218 can exchange thermal energy with the second internal combustion energy system component 28, which in one embodiment, can be via a heat exchanger 66b.

In the present exemplary embodiment as shown in FIG. 3, each of internal combustion energy system component conduits 258 can be fluidly and operably connected to an internal combustion energy system valve assembly 268 which can be operably connected in fluid communication with the internal combustion energy system conduit 228 and integrated into the flow path 238 thereof such that the flow of working fluid 218 fluidly communicated between the upstream end 240 and the downstream end 242 of the internal combustion energy system conduit 228 can be fluidly directed through the internal combustion energy system valve assembly 268. In particular, in one embodiment, the internal combustion energy system valve assembly 268 can include one or more or a plurality of flow control valves and/or other flow control elements (not shown) which can be actuated to controllably, selectively and/or sequentially direct the flow of working fluid 218 fluidly directed therethrough through each, any one or more and/or any combination and sequence of the first internal combustion energy system component conduit 260 and/or the second internal combustion energy system component conduit 262 to exchange thermal energy, extract heat, cool, and generate energy from each, any one or more and/or any combination and sequence of the first and/or the second internal combustion energy system component 26, 28 such that the working fluid 218 may gain thermal energy. Additionally, in one embodiment, the internal combustion energy system valve assembly 268 (and/or one or more of the foregoing included flow control elements thereof) can be electronically actuatable and electronically and controllably connected to the energy recovery and cooling system controller 62 such that the internal combustion energy system valve assembly 268 can be actuated to controllably, selectively and/or sequentially direct the flow of working fluid 218 as provided above in response to one or more signals from the energy recovery and cooling system controller 62.

The electrical energy system conduit 230 can include a plurality of electrical energy system component conduits 270, each connected in fluid communication with the electrical energy system flow path 244 between the upstream end 246 and downstream end 248 of the electrical energy system conduit 230 and positioned to extend adjacent to, along and/or through or otherwise in thermal proximity and communication with each of the individual electrical energy system components 36 which may generate heat and/or require cooling. In particular, the electrical energy system component conduits 270 can include a first electrical energy system component conduit 272, a second electrical energy system component conduit 274, a third electrical energy system component conduit 276, and a fourth electrical energy system component conduit 278. The first electrical energy system component conduit 272 can be associated with and positioned in thermal proximity and communication with the first electrical energy system component 38 and can fluidly direct working fluid 218 along a first electrical energy system component flow path 280 such that the working fluid 218 fluidly communicated therethrough can exchange thermal energy with the first electrical energy system component 38, which in one embodiment, can be via a heat exchanger 66c. Similarly, and as illustrated in FIG. 3, each of the second, third, and fourth electrical energy system component conduits 274, 276, 278, can fluidly direct working fluid 218 along a second, third, and fourth electrical energy system component flow path 282, 284, 286, respectively, such that the working fluid 218 fluidly communicated therethrough can exchange thermal energy with the second, third, and fourth electrical energy system components, 40, 42, 44, respectively, which in one embodiment, can be via heat exchangers 66d, 66e, 66f, respectively.

In the present exemplary embodiment as shown in FIG. 3, each of the electrical energy system component conduits 270 can be fluidly and operably connected to an electrical energy system valve assembly 288 which can be operably connected in fluid communication with the electrical energy system conduit 230 and integrated into the flow path 244 thereof such that the flow of working fluid 218 fluidly communicated between the upstream end 246 and downstream end 248 of the electrical energy system conduit 230 can be fluidly directed through the electrical energy system valve assembly 288. In particular, in one embodiment, the electrical energy system valve assembly 288 can include one or more or a plurality of flow control valves and/or other flow control elements (not shown) which can be actuated to controllably, selectively and/or sequentially direct the flow of working fluid 218 fluidly directed therethrough through each, any one or more and/or any combination and sequence of the first, second, third, and/or fourth electrical energy system component conduits 272, 274, 276, 278, to exchange thermal energy, extract heat, cool, and generate energy from each, any one or more and/or any combination and sequence of the first, second, third, and/or fourth individual electrical energy system components 38, 40, 42, 44, such that the working fluid 218 may gain thermal energy. Additionally, in one embodiment, the electrical energy system valve assembly 288 (and/or one or more of the foregoing included flow control elements thereof) can be electronically actuatable and electronically and controllably connected to the energy recovery and cooling system controller 62 such that the electrical energy system valve assembly 288 can be actuated to controllably, selectively and/or sequentially direct the flow of working fluid 218 as provided above in response to one or more signals from the energy recovery and cooling system controller 62.

In addition to generating an internal combustion energy system circuit activation signal or an electrical energy system circuit activation signal to switch the path of the working fluid 218 between the internal combustion energy system circuit 250 and the electrical energy system circuit 252 as provided herein, the energy recovery and cooling system 200 can also be configured to controllably, selectively and/or sequentially direct the flow of working fluid 218 to exchange thermal energy, extract heat, cool, and generate energy from each, any one or more and/or any combination and sequence of the individual internal combustion energy system components 24 or the individual electrical energy system components 36 in response to, in part, the operating temperature, heat production, and/or the cooling demands of any one or more of the internal combustion energy system components 24 and electrical energy system components 36. In particular, the energy recovery and cooling system controller 62 may receive one or more readings or signals from the temperature sensors 64 of the internal combustion energy system components 24 and those of the electrical energy system components 36 and/or from or in response to the master controller's 60 signals monitoring and/or controlling the hybrid powertrain 16 that one of the first internal combustion energy system component 26 or the second internal combustion energy system component 28 is the internal combustion energy system component 24 having the highest temperature and/or most increasing and/or highest intensity of operation or actuation, in addition to temperature/actuation/intensity of operation signals of the other internal combustion energy system components 24.

In response, the energy recovery and cooling system controller 62 may transmit one or more internal combustion energy system valve assembly actuation signals, which can include one or more internal combustion energy system conduit flow path control signals to the internal combustion energy system valve assembly 268 to direct the flow of working fluid 218 sequentially and successively through the internal combustion energy system component conduit 258 of the lowest temperature and/or intensity of operation/actuation internal combustion energy system component 24 as the upstream-most internal combustion energy system component flow path (such as 264 or 266) between the upstream end 240 and the downstream end 242 of the internal combustion energy system conduit 228. Additionally, in one embodiment, in response to the one or more internal combustion energy system valve assembly actuation signals, which can include one or more internal combustion energy system conduit flow path control signals from the energy recovery and cooling system controller 62, the internal combustion energy system valve assembly 268 may be actuated to direct the flow of working fluid 218 through the internal combustion energy system component conduit 258 of the highest temperature and/or intensity of operation/actuation internal combustion energy system component 24 as the downstream-most internal combustion energy system component flow path (such as 266 or 264) between the upstream end 240 and the downstream end 242 of the internal combustion energy system conduit 228.

Additionally, in one example, the energy recovery and cooling system controller 62 may receive one or more readings or signals from the associated temperature sensor 64 or master controller 60 that the other of the first internal combustion energy system component 26 or the second internal combustion energy system component 28 is inactive or has a temperature reading or signal indicative of no thermal energy or activity. In response, the energy recovery and cooling system controller 62 may transmit one or more internal combustion energy system valve assembly actuation signals, which can include one or more internal combustion energy system conduit flow path control signals to the internal combustion energy system valve assembly 268 to actuate the internal combustion energy system valve assembly 268 to divert or block the flow of working fluid 218 between the upstream end 240 and the downstream end 242 of the internal combustion energy system conduit 228 from being directed through the internal combustion energy system component conduit 258 of any such internal combustion energy system component 24 which may be inactive and or may have temperature reading or signal indicative of no thermal energy or activity. In yet another embodiment, the energy recovery and cooling system controller 62 may transmit one or more of the foregoing activation and flow path control signals to the internal combustion energy system valve assembly 268 such that the flow of working fluid 218 is transmitted directly to any one or more internal combustion energy system components 24 (via the associated internal combustion energy system component conduits 258) having acute cooling needs and/or an operating temperature above a predefined threshold, while diverting or blocking the flow of working fluid 218 through the internal combustion energy system component conduit 258 of any one or more inactive and/or lower or low temperature internal combustion energy system components 24, as provided above.

The energy recovery and cooling system controller 62 may alternatively, or additionally receive one or more readings or signals from the temperature sensors 64 and/or the master controller 60 as provided herein of the temperature and/or activation and/or intensity of operation or actuation of each of the first, second, third, and/or fourth electrical energy system component 38, 40, 42, 44, which can include one or more signals or readings that one of the foregoing electrical energy system components 36 has the highest temperature and/or most increasing and/or highest intensity of operation or actuation. In response, the energy recovery and cooling system controller 62 may transmit one or more electrical energy system valve assembly actuation signals, which can include one or more electrical energy system conduit flow path control signals, to the electrical energy system valve assembly 288 such that the electrical energy system valve assembly 288 directs the working fluid 218 through each, any one or more and/or any combination and sequence of the electrical energy system component conduits 270 of each of the electrical energy system components 36 in order corresponding to the temperature and/or activation and/or intensity of operation or actuation of each of the electrical energy system components 36 from lowest to highest, with electrical energy system component conduit 270 of the lowest temperature and/or activation and/or intensity of operation electrical energy system components 36 as the upstream-most electrical energy system component flow path (any one of 280, 282, 284, 286) and the electrical energy system component conduit 270 of the highest temperature and/or activation and/or intensity of operation electrical energy system component 36 as the downstream-most electrical energy system component flow path (any one of 280, 282, 284, 286) between the upstream end 246 and the downstream end 248 of the electrical energy system conduit 230.

Additionally, in one example, the energy recovery and cooling system controller 62 may receive one or more readings or signals that one or more of the electrical energy system components 36 may be inactive or may have a temperature reading or signal indicative of no thermal energy or activity. In response, the energy recovery and cooling system controller 62 may transmit one or more signals as provided above which can include one or more electrical energy system conduit flow path control signals to actuate the electrical energy system valve assembly 288 to divert or block the flow of working fluid 218 between the upstream end 246 and the downstream end 248 of the electrical energy system conduit 230 from being directed through any associated electrical energy system component conduits 270 of any such electrical energy system components 36 which may be inactive and or may have temperature reading or signal indicative of no thermal energy or activity. In yet another embodiment, the energy recovery and cooling system controller 62 may transmit one or more of the foregoing activation and flow path control signals to the internal combustion energy system valve assembly 268 such that the flow of working fluid 218 is transmitted directly to any one or more electrical energy system components 36 (via the associated electrical energy system component conduits 270) having acute cooling needs and/or an operating temperature above a predefined threshold, while diverting or blocking the flow of working fluid 218 through the associated electrical energy system component conduits 270 of any one or more inactive and/or lower or low temperature electrical energy system components 36, as provided above.

Figure 4:
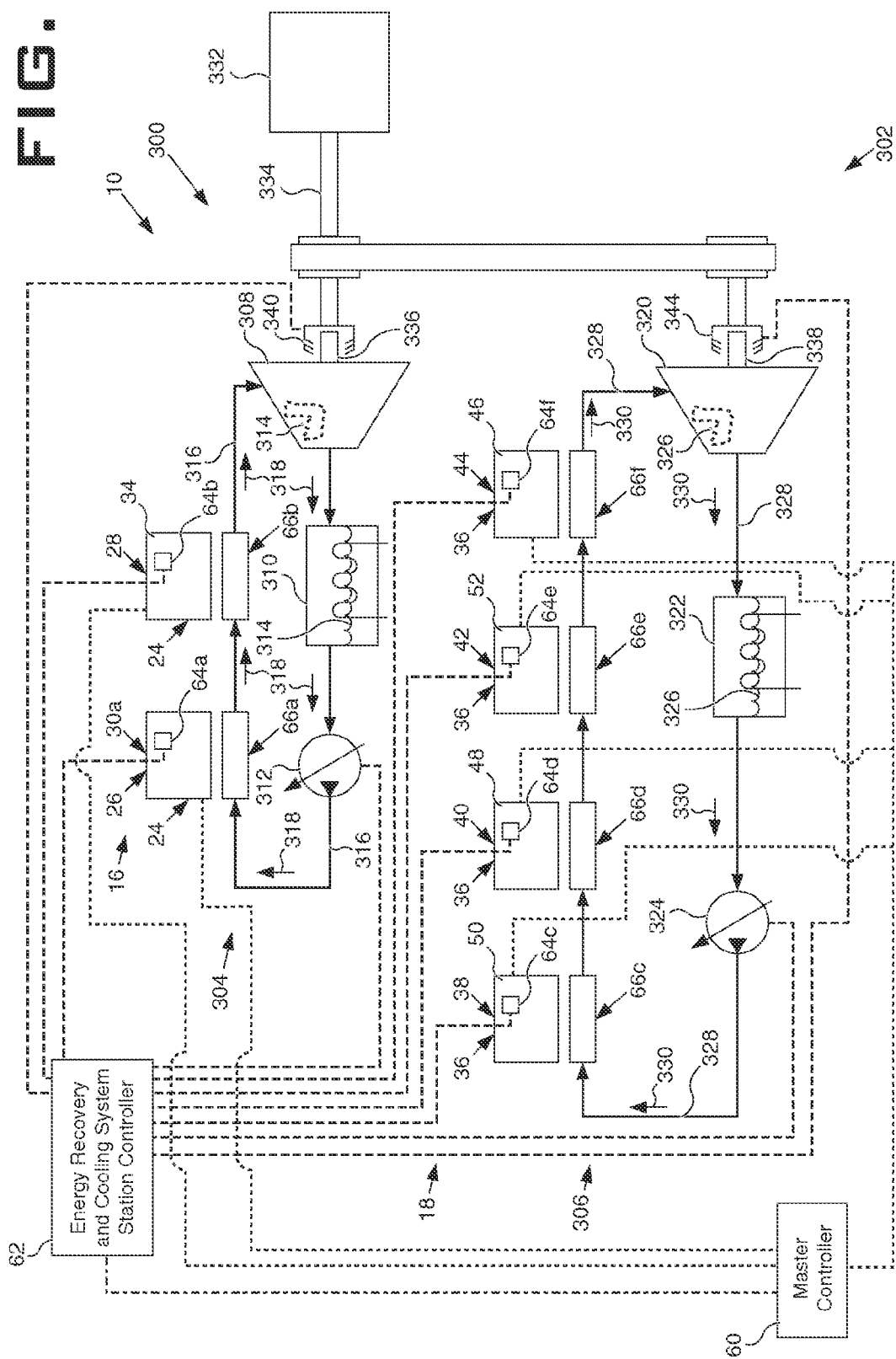
FIG. 4 is a schematic and diagrammatic illustration of another embodiment of the exemplary disclosed energy recovery and cooling system for the hybrid powertrain of the hybrid machine illustrated in FIG. 1.

FIG. 4 illustrates another embodiment of the energy recovery and cooling system 10 of the present disclosure implemented and utilized as an energy recovery and cooling system for the hybrid powertrain 14 of the hybrid machine 12 illustrated in FIG. 1. In particular, the energy recovery and cooling system 300 of FIG. 4 illustrates another embodiment of the energy recovery and cooling system 10 for the hybrid powertrain 14 of the hybrid machine 12 illustrated in FIG. 1. As shown in FIG. 4, the energy recovery and cooling system 300 can include an energy recovery and cooling circuit 302, which can include an internal combustion energy system circuit 304 as well as an electrical energy system circuit 306 which can each be fluidly separate individual closed loop circuits and can each include and be configured to direct separate working fluid along and through separate conduits and fluid delivery paths. In particular, the internal combustion energy system circuit 304 can include a first turbine 308, a first condenser 310 and a first pump 312, each operably connected in fluid communication and fluidly integrated into the internal combustion energy system circuit 304 to operatively interact with first working fluid 314 contained therein. The internal combustion energy system circuit 304 can also include an internal combustion energy system conduit 316 which can fluidly direct the first working fluid 314 along and throughout an internal combustion energy system flow path 318.

As shown in the exemplary embodiment of FIG. 4, the internal combustion energy system conduit 316 and internal combustion energy system flow path 318 can be fluidly connected to direct the first working fluid 314 sequentially and successively through the first turbine 308, which can be fluidly connected via the internal combustion energy system conduit 316 and positioned downstream of the individual internal combustion energy system components 24, through the first condenser 310, which can be fluidly connected via the internal combustion energy system conduit 316 and positioned downstream of the first turbine 308, and through the first pump 312, which can be fluidly connected via the internal combustion energy system conduit 316 and positioned downstream of the first condenser 310. The internal combustion energy system conduit 316 can also be fluidly connected and/or positioned to direct the first working fluid 314 adjacent to, along and/or through or otherwise in thermal proximity and communication with each of the individual internal combustion energy system components 24 which may generate heat and/or require cooling. In particular, the first internal combustion energy system component 26 (and, in one example, the heat exchanger 66a thereof) can be positioned along the internal combustion energy conduit 316 and flow path 318 thereof downstream of the first pump 312 and upstream of the second internal combustion energy system component 28 (and, in one example, the heat exchanger 66b thereof) which can be positioned upstream of the first turbine 308. As provided by and consistent with the applicable portions of the foregoing embodiments, the downstream-most or second internal combustion energy system component 28 can be any internal combustion energy system component 24 which can have a normal operating temperature equal to or higher than that of the upstream or first internal combustion energy system component 26 based upon/defined by factors including but not limited to hybrid powertrain 14 architecture and/or operation modes thereof as provided herein, such that as the first working fluid 314 passes along and through the internal combustion energy system conduit 316 and flow path 318 thereof and exchanges thermal energy with each of the individual internal combustion energy system components 24, the first working fluid 314 may successively gain thermal energy.

The electrical energy system circuit 306 can include a second turbine 320, a second condenser 322 and a second pump 324, each operably connected in fluid communication and fluidly integrated into electrical energy system circuit 306 to operatively interact with second working fluid 326 contained therein. The electrical energy system circuit 306 can also include an electrical energy system conduit 328 which can fluidly direct the second working fluid 326 along and throughout an electrical energy system flow path 330.

As shown in the exemplary embodiment of FIG. 4, electrical energy system conduit 328 and electrical energy system flow path 330 can be fluidly connected to direct the second working fluid 326 sequentially and successively through the second turbine 320, which can be connected in fluid communication (which can be via the electrical energy system conduit 328) with and positioned downstream of the individual electrical energy system components 36, through the second condenser 322, which can be fluidly connected in fluid communication with and positioned downstream of the second turbine 320, and through the second pump 324, which can be fluidly connected in fluid communication with and positioned downstream of the second condenser 322 and upstream of the individual electrical energy system components 36. The electrical energy system conduit 328 can also be fluidly connected and/or positioned to direct the second working fluid 326 adjacent to, along and/or through or otherwise in thermal proximity and communication with each of the individual electrical energy system components 36 which may generate heat and/or require cooling. In one embodiment, the first, second, and third electrical energy system components 38, 40, 42, (and, in one example, the heat exchangers 66c, 66d, 66e thereof, respectively) can be positioned along the electrical energy system conduit 328 and flow path 330 thereof upstream of the second, third, and fourth electrical energy system components 40, 42, 44, (and, in one example, the heat exchangers 66d, 66e, 66f thereof), respectively. As provided by and consistent with the applicable portions of the foregoing embodiments, each downstream electrical energy system component 36, such as the second, third, and fourth electrical energy system components 40, 42, 44, can be any electrical energy system component which can have a normal operating temperature equal to or higher than that of any and/or each upstream electrical energy system component 36, such as the respective upstream first, second, and third electrical energy system components 38, 40, 42 based upon/defined by factors including any one or more hybrid powertrain architecture and/or operation modes thereof as provided herein, such that as the second working fluid 326 passes along and through the electrical energy system conduit 328 and flow path 330 thereof and exchanges thermal energy with each of the electrical energy system components 36, the second working fluid 326 may successively gain thermal energy.

The fluidly separate, closed loop internal combustion energy system circuit 304 as well as the fluidly separate, closed loop electrical energy system circuit 306 of the energy recovery and cooling circuit 302 of the present embodiment illustrated in FIG. 4 can be selectively activated, which in one embodiment can be via the energy recovery and cooling system controller 62, to route and direct the first working fluid 314 or second working fluid 326, respectively, to exchange thermal energy, extract heat, cool, and generate mechanical energy from the internal combustion energy system components 24 or the electrical energy system components 36 via the rotation of the first turbine 308 and the second turbine 320, respectively. The mechanical energy generated via the rotation of the first turbine 308 and that generated via the rotation of the second turbine 320 from the expansion of the respective first working fluid 314 and second working fluid 226 therethrough (consistent with the foregoing embodiments) can be mechanically transmitted to a common power component 332 which can be configured to convert rotational mechanical energy into electrical energy via a common turbine output shaft 334.

In particular, as shown in FIG. 4, the first turbine 308 of the internal combustion energy system circuit 304 can include a first turbine output shaft 336 and similarly, the second turbine 320 of the electrical energy system circuit 306 can include a second turbine output shaft 338. The first turbine output shaft 336 can be selectively coupled and engaged and disengaged from transmitting rotational mechanical energy to the common turbine output shaft 334 via a first turbine output shaft clutch 340 therebetween. Similarly, the second turbine output shaft 338 can be selectively coupled and engaged and disengaged from transmitting rotational mechanical energy to the common turbine output shaft 334 via a second turbine output shaft clutch 344 therebetween. In one embodiment, each of the first turbine output shaft clutch 340 and second turbine output shaft clutch 344 can be electronically actuatable and electronically and controllably connected to the energy recovery and cooling system controller 62 to selectively engage and disengage the connection and transmission of mechanical energy from the first turbine output shaft 336 and the second turbine output shaft 338, respectively, to the common turbine output shaft 334, respectively from transmitting rotational mechanical energy to the common turbine output shaft 334 in response to one or more signals from the energy recovery and cooling system controller 62. In addition, each of the first pump 312 and the second pump 324 can be electronically actuatable, and in one example can additionally be electronically controllable variable displacement pumps, wherein each of the first and second pumps 312, 324 can be electronically and controllably connected to the energy recovery and cooling system controller 62 to be activated to propel the first or second working fluid 314, 326 through the internal combustion energy system circuit 304 or the electrical energy system circuit 306, respectively, in response to one or more signals from the energy recovery and cooling system controller 62.

With this operable configuration, the energy recovery and cooling system controller 62 can be configured, in part, to selectively activate the internal combustion energy system circuit 304 or the electrical energy system circuit 306 in response to any one or more of the operating temperature, heat production, and/or the cooling demands of any one or more of the internal combustion energy system components 24 and/or electrical energy system components as 36 well as any one or more of the activation, control, and/or operation of the internal combustion energy system 16, the electrical energy system 18, and/or the additional components of the hybrid powertrain 14. In particular, and in a manner substantially consistent with the foregoing applicable embodiments, the energy recovery and cooling system controller 62 may receive one or more readings or signals from the associated temperature sensor 64 or master controller 60 that one of the internal combustion energy system 16 and the one or more of the internal combustion energy system components 24 thereof, or alternatively the electrical energy system 18 and the one or more of the electrical energy system components 36 thereof, may have or include any one or more of the highest temperature and/or activation and/or intensity of operation or actuation. In response, the energy recovery and cooling system controller 62 may electronically transmit one or more internal combustion energy system circuit activation signals, or alternatively, one or more electrical energy system circuit activation signals to the first pump 312 and the first turbine output shaft clutch 340 of the internal combustion energy system circuit 304, or the second pump 324 and the second turbine output shaft clutch 344 of the electrical energy system circuit 306, respectively, to exchange thermal energy, extract heat, cool, and generate energy from the internal combustion energy system components 24 or the electrical energy system components 36, respectively, substantially consistent with the foregoing applicable embodiments.

Figure 5:
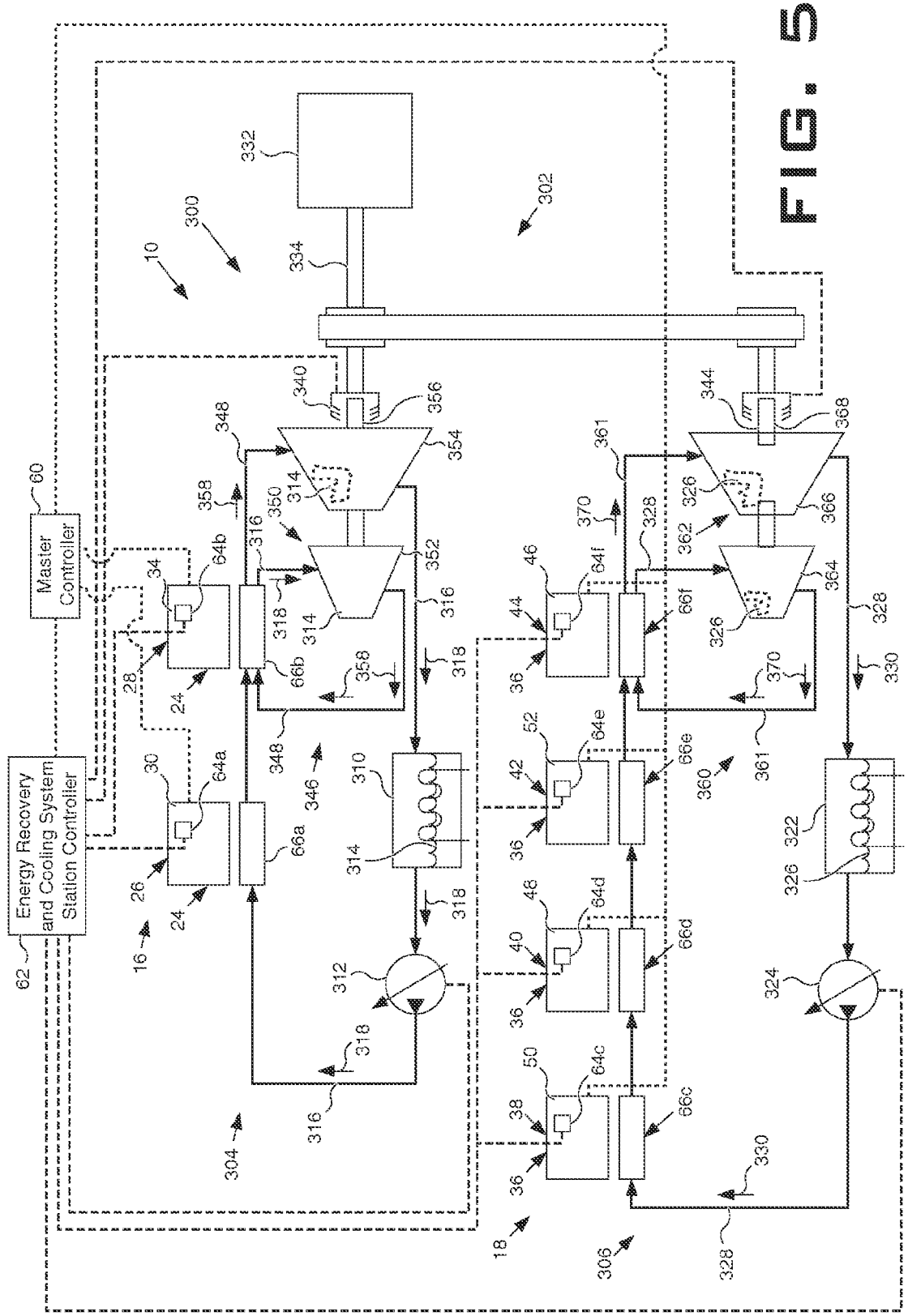
FIG. 5 is a schematic and diagrammatic illustration of an alternate embodiment of the exemplary disclosed energy recovery and cooling system illustrated in FIG. 4.

FIG. 5 illustrates an alternate embodiment or variant of the energy recovery and cooling system 300, and energy recovery and cooling circuit 302 thereof shown in FIG. 4. In particular, as illustrated by the exemplary embodiment shown in FIG. 5, each of the internal combustion energy system circuit 304 as well as the electrical energy system circuit 306 of the energy recovery and cooling circuit 302 can include a reheat circuit.

In the present exemplary embodiment illustrated in FIG. 5, the internal combustion energy system circuit 304 can additionally include an internal combustion energy system reheat circuit 346, as well as an included internal combustion energy system reheat conduit 348. Additionally, in the present embodiment, the first turbine 308 shown in FIG. 4 can be replaced with a first turbine assembly 350 which can include two turbines, a high pressure turbine 352 and a low pressure turbine 354, which can be operably connected in fluid communication and fluidly integrated into the internal combustion energy system circuit 304 and internal combustion energy system reheat circuit 346, and additionally can be arranged in series and commonly attached to a first turbine assembly output shaft 356. In manner substantially consistent with FIG. 4, the first turbine assembly output shaft 356 can be selectively coupled and engaged and disengaged from transmitting rotational mechanical energy to the common turbine output shaft 334 (and to the common power component 332) via the first turbine output shaft clutch 340 therebetween.

The internal combustion energy system conduit 316 can be fluidly connected to sequentially and successively direct the first working fluid 314 through the first condenser 310, the first pump 312 and adjacent to, along and/or through or otherwise in thermal proximity and communication, which can be via associated heat exchangers 66, with the internal combustion energy system components 26. In particular, the internal combustion energy system conduit 316 can be fluidly connected to direct the first working fluid 314 along the internal combustion energy system flow path 318 to sequentially and successively exchange thermal energy with the first internal combustion energy system component 26 and subsequently with the second internal combustion energy system component 28, which can be via the associated heat exchangers 66a and 66b, respectively, such that the first working fluid 314, which may be at a high pressure via the first pump 312, may successively gain thermal energy and may be heated from the first temperature (T1) to an elevated, higher second temperature (T2) to a vapor (whereas T2>T1). From the downstream-most internal combustion energy system component 24, which can be the second internal combustion energy system component 28 and can be any internal combustion energy system component 24 which can have a normal operating temperature equal to or higher than that of the upstream first internal combustion energy system component 26 according to a variety of factors as provided herein, the internal combustion energy system conduit 316 can be connected to direct the first working fluid 314, which may be at high temperature (T2) and high pressure as provided above, through the high pressure turbine 352 of the first turbine assembly 350 (wherein expansion of the first working fluid 314 therethrough may generate mechanical energy via the resultant rotation thereof) and into the internal combustion energy system reheat circuit 346 and reheat conduit 348 thereof.

In one embodiment, the internal combustion energy system reheat conduit 348 can be fluidly connected to receive and direct the first working fluid 314 from the outlet or downstream end of the high pressure turbine 352 along a second or internal combustion energy system reheat flow path 358 which can extend adjacent to, along and/or through or otherwise in thermal proximity and communication with the downstream-most (which can be the second 28) internal combustion energy system component 24, which can be via the associated heat exchanger 66, and finally can direct the first working fluid 314 through the low pressure turbine 354 of the first turbine assembly 350 (wherein expansion of the first working fluid 314 therethrough may generate mechanical energy via the resultant rotation thereof) and into the internal combustion energy system conduit 316. In particular, the internal combustion energy system reheat conduit 348 may direct the first working fluid 314, which may be at a reduced pressure and an intermediate temperature (Ti) between the first temperature (T1) and the higher second temperature (T2) (whereas T2>T1>T1) from the high pressure expansion through the high pressure turbine 352, through the internal combustion energy system reheat flow path 358 in thermal proximity and communication with the downstream-most (which can be the second 28) internal combustion energy system component 24 such that the first working fluid 314 at lower pressure exchanges thermal energy or may be "re-heated" from the intermediate temperature (Ti) to the elevated, higher second temperature (T2) and in a vapor phase (whereas T2>Ti). From the downstream-most (which can be the second 28) internal combustion energy system component 24, the internal combustion energy system reheat conduit 348 can be connected to direct the "re-heated" first working fluid 314, which may be substantially at the higher temperature (T2) and lower pressure as provided above, through the low pressure turbine 354 and into the internal combustion energy system conduit 316. Thereafter, the internal combustion energy system conduit 316 may fluidly direct the first working fluid 314 to the first condenser 310, first pump 312, and along the internal combustion energy system circuit 304 for another cycle as provided above.

Additionally, in the present embodiment, the electrical energy system circuit 306 can include an electrical energy system reheat circuit 360, as well as an included electrical energy system reheat conduit 361. Additionally, in the present embodiment, the second turbine 320 shown in FIG. 4 can be replaced with a second turbine assembly 362 which can include two turbines, a high pressure turbine 364 and a low pressure turbine 366, which can be operably connected in fluid communication and fluidly integrated into the electrical energy system circuit 306 and the electrical energy system reheat circuit 360, and additionally can be arranged in series and commonly attached to a second turbine assembly output shaft 368. In manner substantially consistent with FIG. 4, the second turbine assembly output shaft 368 can be selectively coupled and engaged and disengaged from transmitting rotational mechanical energy to the common turbine output shaft 334 (and to the common power component 332) via the second turbine output shaft clutch 344 therebetween.

The electrical energy system conduit 328 can be fluidly connected to sequentially and successively direct the second working fluid 326 through the second condenser 322, the second pump 324 and adjacent to, along and/or through or otherwise in thermal proximity and communication, which can be via associated heat exchangers 66c-66f, with the electrical energy system components 36. In particular, the electrical energy system conduit 328 can be fluidly connected to direct the second working fluid 326 along the electrical energy system flow path 338 to sequentially and successively exchange thermal energy with electrical energy system components 36 such that the second working fluid 326 may successively gain thermal energy and may be at a high pressure and heated from the first temperature (T1) to an elevated, higher second temperature (T2) to a vapor (whereas T2>T1). From the downstream-most, electrical energy system component 36, which in one embodiment can be the fourth electrical combustion energy system component 44 which, as provided above, can be any electrical energy system component, including but not limited to a battery 50, electronics module 48, generator 52 or electrical motor 46, which can have a normal operating temperature equal to or higher than that of each of the respective upstream first, second, and/or third electrical energy system components 38, 40, 42, the electrical energy system conduit 328 can be connected to direct the second working fluid 326, which may be at high temperature (T2) and high pressure as provided above, through the high pressure turbine 364 of the second turbine assembly 362 (wherein expansion of the second working fluid 326 therethrough may generate mechanical energy via the resultant rotation thereof) and into the electrical energy system reheat circuit 360 and electrical energy system reheat conduit 361.

In one embodiment, the electrical energy system reheat conduit 361 can be fluidly connected to receive and direct the second working fluid 326 from the outlet or downstream end of the high pressure turbine 364 of the second turbine assembly 362 along a second or electrical energy system reheat flow path 370 which extends adjacent to, along and/or through or otherwise in thermal proximity and communication (which can be via the associated heat exchanger 66) with the downstream-most, highest temperature electrical energy system component 363, which can be the fourth electrical energy system component 44, through the low pressure turbine 366 of the second turbine assembly 362 (wherein expansion of the first second working fluid 326 therethrough may generate mechanical energy via the resultant rotation) and into the electrical energy system conduit 328. In particular, the electrical energy system reheat conduit 361 may direct the second working fluid 326, which may be at a reduced pressure and an intermediate temperature (Ti) between the first temperature (T1) and the higher second temperature (T2) (whereas T2>Ti>T1) from the high pressure expansion through the high pressure turbine 364, through the electrical energy system reheat flow path 370 and in thermal proximity and communication with the downstream-most, highest temperature electrical energy system component 36 such that the second working fluid 326 at lower pressure exchanges thermal energy or may be "re-heated" from the intermediate temperature (T1) to the elevated, higher second temperature (T2) and in a vapor phase (whereas T2>Ti). From the downstream-most electrical energy system component 36, the electrical energy system reheat conduit 361 can be connected to direct the second working fluid 326, which may be substantially at the higher temperature (T2) and lower pressure as provided above, through the low pressure turbine 366 and into the electrical energy system conduit 328. Thereafter, the electrical energy system conduit may fluidly direct the second working fluid 326 to the second condenser 322, second pump 324, and along and throughout the electrical energy system circuit 306 for another cycle as provided above.

Figure 6:
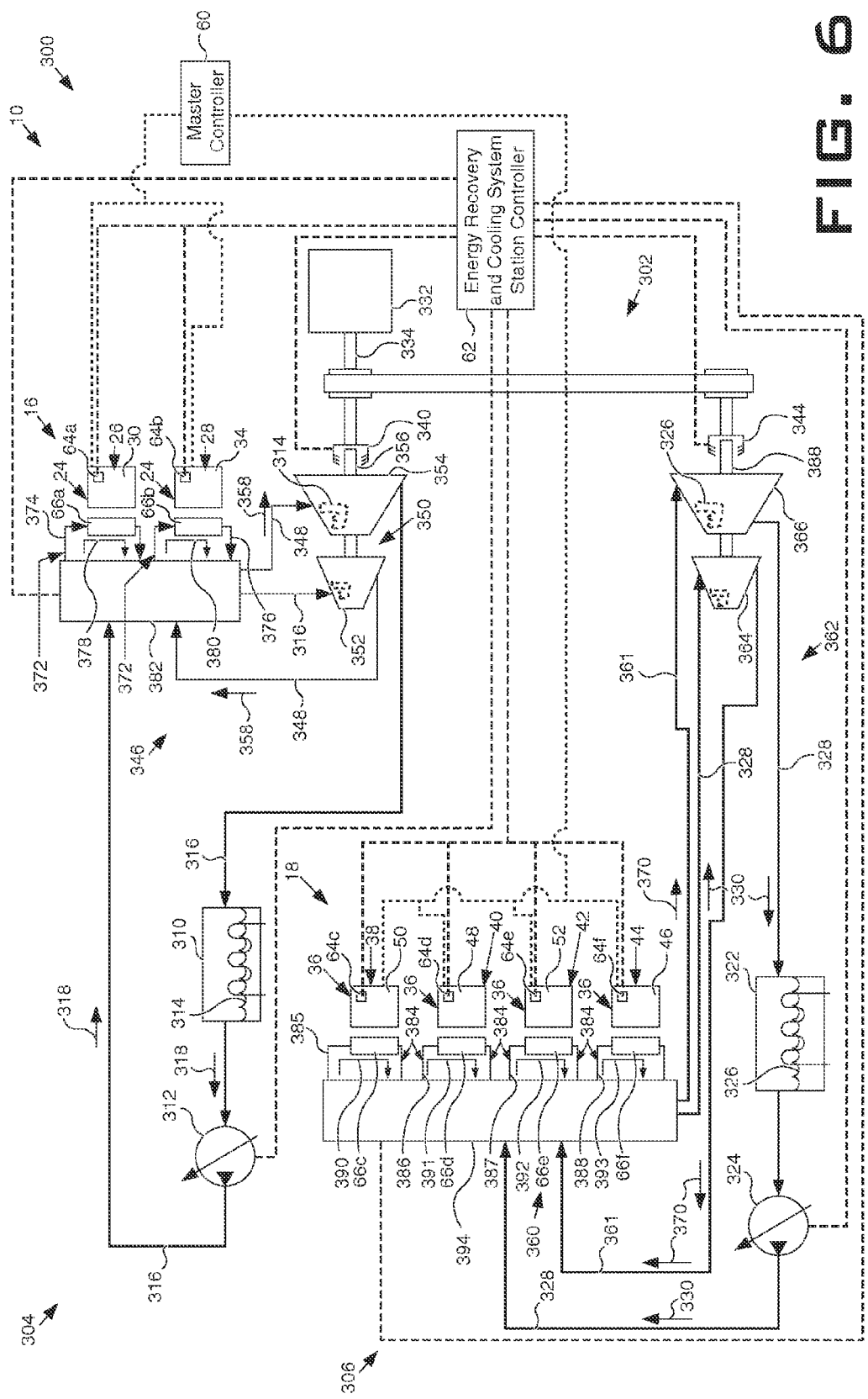
FIG. 6 is a schematic and diagrammatic illustration of an alternate embodiment of the exemplary disclosed energy recovery and cooling system illustrated in FIG. 5.

FIG. 6 illustrates an alternate embodiment or variant of the energy recovery and cooling system 300, and energy recovery and cooling circuit 302 thereof shown in FIG. 5. As illustrated by the exemplary embodiment shown in FIG. 6, in one embodiment, the internal combustion energy system circuit 304 and, the internal combustion energy system reheat circuit 346 included therein, can include a plurality of internal combustion energy system component conduits 372, each connected in fluid communication therewith such that the flow of first working fluid 314 fluidly directed through the internal combustion energy system flow path 318 as well as the internal combustion energy system reheat flow path 358 can be controllably, selectively and/or sequentially directed to exchange thermal energy, extract heat, cool, and generate energy from each, any one or more and/or any combination and sequence of the internal combustion energy system components 24. In particular, the internal combustion energy system component conduits can include a first internal combustion energy system component conduit 374 and a second combustion energy system component conduit 376. The first internal combustion energy system component conduit 374 can fluidly direct the first working fluid 314 along a first internal combustion energy system component flow path 378 such that the first working fluid 314 fluidly communicated therethrough can exchange thermal energy with the first internal combustion energy system component 26, which in one embodiment, can be via a heat exchanger 66a. Similarly, the second internal combustion energy system component conduit 376 can fluidly communicate the first working fluid 314 along a second internal combustion energy system component flow path 380 such that the first working fluid 314 can exchange thermal energy with the second internal combustion energy system component 28, which in one embodiment, can be via a heat exchanger 66b.

In the present exemplary embodiment as shown in FIG. 6, each of the internal combustion energy system component conduits 372 can be fluidly and operably connected to an internal combustion energy system valve assembly 382. As further shown in FIG. 6, the internal combustion energy system valve assembly 382 can be operably connected in fluid communication with the internal combustion energy system conduit 316 such that the flow of first working fluid 314 fluidly communicated along the internal combustion energy system flow path 318 between the first pump 312 and the high pressure turbine 352 of the first turbine assembly 350 can be fluidly directed through the internal combustion energy system valve assembly 382. The internal combustion energy system valve assembly 382 can also be operably connected fluid communication with the internal combustion energy system reheat conduit 348 such that the flow of first working fluid 314 fluidly communicated along the internal combustion energy system reheat flow path 358 between the high pressure turbine 352 of the first turbine assembly 350 and the low pressure turbine 354 of the first turbine assembly 350 can additionally be fluidly directed through the internal combustion energy system valve assembly 382.

The internal combustion energy system valve assembly 382 can include one or more or a plurality of flow control valves and/or other flow control elements (not shown), or any other operable configuration such that the internal combustion energy system valve assembly 382 can be fluidly and operably connected and actuated to controllably, selectively and/or sequentially direct the flow of first working fluid 314, fluidly communicated through the internal combustion energy system conduit 316 between the first pump 312 and the high pressure turbine 352 of the first turbine assembly 350, through each, any one or more and/or any combination and sequence of the first internal combustion energy system component conduit 374 and/or the second combustion energy system component conduit 376 to exchange thermal energy, extract heat, cool, and generate energy from each, any one or more and/or any combination and sequence of the first internal combustion energy system component 26 and/or the second internal combustion energy system component 28 such that the first working fluid 314 may gain thermal energy. In a substantially consistent manner, the internal combustion energy system valve assembly 382 can be fluidly and operably connected and actuated to controllably, selectively and/or sequentially direct the flow of first working fluid 314, fluidly communicated through the internal combustion energy system reheat conduit 348 and flow path 358 between the high pressure turbine 352 and the low pressure turbine 354 of the first turbine assembly 350, through any one or more and/or any combination and sequence of the internal combustion energy system component conduit 372 to exchange thermal energy, extract heat, cool, and generate energy from each, any one or more and/or any combination and sequence of the internal combustion energy system components 24 consistent with the foregoing such that the first working fluid 314 may gain thermal energy. In one embodiment, the internal combustion energy system valve assembly 382 (and/or one or more of the foregoing included flow control elements thereof) can be electronically actuatable and electronically and controllably connected to the energy recovery and cooling system controller 62 such that the internal combustion energy system valve assembly 382 can be actuated to controllably, selectively and/or sequentially direct the flow of first working fluid 314 as provided above in response to one or more signals from the energy recovery and cooling system controller 62.

As further illustrated by the exemplary embodiment shown in FIG. 6, in one embodiment, the electrical energy system circuit 306 and the electrical energy system reheat circuit 360 included therein, can include a plurality of electrical energy system component conduits 384, each connected in fluid communication therewith such that the flow of second working fluid 326 through the electrical energy system flow path 330 as well as the electrical energy system reheat flow path 370 can be controllably, selectively and/or sequentially directed to exchange thermal energy, extract heat, cool, and generate energy from each, any one or more and/or any combination and sequence of the electrical energy system components 36. In particular, the electrical energy system component conduits 384 can include a first electrical energy system component conduit 385, a second electrical energy system component conduit 386, a third electrical energy system component conduit 387, and a fourth electrical energy system component conduit 388. The first electrical energy system component conduit 385 can be associated with and positioned in thermal proximity and communication with the first electrical energy system component 38 and can fluidly direct the second working fluid 326 along a first electrical energy system component flow path 390 such that the second working fluid 326 fluidly communicated therethrough can exchange thermal energy with the first electrical energy system component 38, which in one embodiment, can be via a heat exchanger 66c. Similarly, and as illustrated in FIG. 3, each of the second, third, and fourth electrical energy system component conduits 386, 387, 388 can fluidly direct the second working fluid 326 along a second, third, and fourth electrical energy system component flow path, 391, 392, 393 respectively, such that the second working fluid 326 fluidly communicated therethrough can exchange thermal energy with the second, third, and fourth electrical energy system components, 40, 42, 44 respectively, which in one embodiment, can be via heat exchangers 66d, 66e, 66f, respectively associated therewith.

In the present exemplary embodiment as shown in FIG. 6, each of the first, second, third, and fourth electrical energy system component conduits 385, 386, 387, 388 can be fluidly and operably connected to an electrical energy system valve assembly 394. As further shown in FIG. 6, the electrical energy system valve assembly 394 can be operably connected fluid communication with the electrical energy system conduit 328 such that the flow of second working fluid 326 fluidly communicated along the electrical energy system flow path 330 between the second pump 324 and the high pressure turbine 364 of the second turbine assembly 362 can be fluidly directed through the electrical energy system valve assembly 394. The electrical energy system valve assembly 394 can also be operably connected fluid communication with the electrical energy system reheat conduit 361 such that the flow of second working fluid 326 fluidly communicated therethrough along the electrical energy system reheat flow path 370 between the high pressure turbine 364 and the low pressure turbine 366 of the second turbine assembly 362 can additionally be fluidly directed through the electrical energy system valve assembly 394.

The electrical energy system valve assembly 394 can include one or more or a plurality of flow control valves and/or other flow control elements (not shown), or any other operable configuration such that the electrical energy system valve assembly 394 can be fluidly and operably connected and actuated to controllably, selectively and/or sequentially direct the flow of second working fluid 326, fluidly communicated through the electrical energy system conduit 328 between the second pump 324 and the high pressure turbine 364 of the second turbine assembly 362, through each, any one or more and/or any combination and sequence of the first, second, third, and/or fourth electrical energy system component conduits 385, 386, 387, 388 to exchange thermal energy, extract heat, cool, and generate energy from each, any one or more and/or any combination and sequence of the first, second, third, and/or fourth electrical energy system components 38, 40, 42, 44 such that the second working fluid 326 may gain thermal energy. In a substantially consistent manner, the electrical energy system valve assembly 394 can be fluidly and operably connected and actuated to controllably, selectively and/or sequentially direct the flow of second working fluid 326, fluidly communicated through the electrical energy system reheat conduit 361 between the high pressure turbine 364 and the low pressure turbine 366 of the second turbine assembly 362, through each, any one or more and/or any combination and sequence of the electrical energy system component conduits 384 to exchange thermal energy, extract heat, cool, and generate energy from each, any one or more and/or any combination and sequence of the electrical energy system components 36 such that the first working fluid 314 may gain thermal energy. In one embodiment, the electrical energy system valve assembly 394 (and/or one or more of the foregoing included flow control elements thereof) can be electronically actuatable and electronically and controllably connected to the energy recovery and cooling system controller 62 such that the electrical energy system valve assembly 394 can be actuated to controllably, selectively and/or sequentially direct the flow of second working fluid 326 as provided above in response to one or more signals from the energy recovery and cooling system controller 62.

In addition to electronically transmitting one or more internal combustion energy system circuit activation signals to activate the internal combustion energy system circuit 304 as provided herein, in a manner substantially consistent with the foregoing applicable embodiments, the energy recovery and cooling system controller 62 may receive one or more readings or signals from the temperature sensors 64 and/or the master controller 60 as provided herein of the temperature and/or activation and/or intensity of operation or actuation of each of the first, second, third, and/or fourth electrical energy system component 38, 40, 42, 44, as well as the first and/or second internal combustion energy system components 26, 28. In response, the energy recovery and cooling system controller 62 may transmit one or more internal combustion energy system valve assembly actuation signals, which can include one or more internal combustion energy system conduit flow path control signals, and in one embodiment, may additionally include one or more internal combustion energy system reheat conduit flow path control signals to the internal combustion energy system valve assembly 382. In response to the one or more internal combustion energy system conduit flow path control signals and the one or more internal combustion energy system reheat conduit flow path control signals, the internal combustion energy system valve assembly 382 may be actuated to direct the flow of first working fluid 314 fluidly communicated through the internal combustion energy system conduit 316 between the first pump 312 and the high pressure turbine 352 of the first turbine assembly 350, and the flow of first working fluid 314 fluidly communicated through the internal combustion energy system reheat conduit 348 between the high pressure turbine 352 and the low pressure turbine 354, respectively, through each, any one or more and/or any combination and sequence of the internal combustion energy system component conduits 372 based upon the temperature and/or activation and/or intensity of operation or actuation (or inactivity) of each of the internal combustion energy system components 24 in a manner consistent with any of the foregoing embodiments.

In particular, in response to one or more internal combustion energy system conduit flow path control signals and/or internal combustion energy system reheat conduit flow path control signals, the internal combustion energy system valve assembly 382 may be actuated to direct the first working fluid 314 fluidly communicated along both or either of the internal combustion energy system flow path 318 and/or the internal combustion energy system reheat flow path 358 sequentially and successively through each, any one or more and/or any combination and sequence of the internal combustion energy system component conduits 372 in order corresponding to the temperature and/or activation and/or intensity of operation or actuation of any one or more internal combustion energy system components 24. In addition, the energy recovery and cooling system controller 62 may transmit one or more internal combustion energy system conduit flow path control signals and the one or more internal combustion energy system reheat conduit flow path control signals to actuate the internal combustion energy system valve assembly 382 to direct the first working fluid 314 fluidly communicated through both or either of the internal combustion energy system flow path 318 and/or internal combustion energy system reheat flow path 358 directly to any one or more internal combustion energy system components 24 (via the internal combustion energy system component conduits 372) having acute cooling needs and/or an operating temperature above a predefined threshold, and/or may divert or block the flow of first working fluid 314 from being directed through any associated internal combustion energy system component conduits 372 of any such internal combustion energy system components 24 which may be inactive and or may have temperature reading or signal indicative of no thermal energy or activity.

Alternatively, and in addition to electronically transmitting one or more electrical energy system circuit activation signals to activate the electrical energy system circuit 306, as provided herein, the energy recovery and cooling system controller 62 may transmit one or more electrical energy system valve assembly actuation signals, which can include one or more electrical energy system conduit flow path control signals, and in one embodiment, may additionally transmit one or more electrical energy system reheat conduit flow path control signals to the electrical energy system valve assembly 395. In response to the one or more electrical energy system conduit flow path control signals, and one or more electrical energy system reheat conduit flow path control signals, the electrical energy system valve assembly 395 may be actuated to direct the flow of second working fluid 326 fluidly communicated through the electrical energy system conduit 328 between the second pump 324 and the high pressure turbine 364 of the second turbine assembly 362, and the flow of second working fluid 326 fluidly communicated through the electrical energy system reheat conduit 361 between the high pressure turbine 364 and the low pressure turbine 366, respectively, through each, any one or more and/or any combination and sequence of the electrical energy system component conduits 384 based upon the temperature and/or activation and/or intensity of operation or actuation (or inactivity) of each of the electrical energy system components 36 in a manner consistent with any of the foregoing embodiments.

In particular, in response to one or more electrical energy system conduit flow path control signals, and one or more electrical energy system reheat conduit flow path control signals, the electrical energy system valve assembly 395 may be actuated to direct the second working fluid 326 fluidly communicated along both or either of the electrical energy system flow path 330 and/or the electrical energy system reheat flow path 370 sequentially and successively through each, any one or more and/or any combination and sequence of the electrical energy system component conduits 384 in order corresponding to the temperature and/or activation and/or intensity of operation or actuation of any one or more electrical energy system components 36. In addition, the energy recovery and cooling system controller 62 may transmit one or more electrical energy system conduit flow path control signals, and one or more electrical energy system reheat conduit flow path control signals to actuate the electrical energy system valve assembly 395 to direct second working fluid 326 fluidly communicated through both or either of the electrical energy system flow path 330 and/or the electrical energy system reheat flow path 370 directly to any one or more electrical energy system components 36 (via the electrical energy system component conduits 384) having acute cooling needs and/or an operating temperature above a predefined threshold, and/or may divert or block the flow of second working fluid 326 from being directed through any associated electrical energy system component conduits 384 of any such electrical energy system components 36 which may be inactive and or may have temperature reading or signal indicative of no thermal energy or activity.

Figure 7:
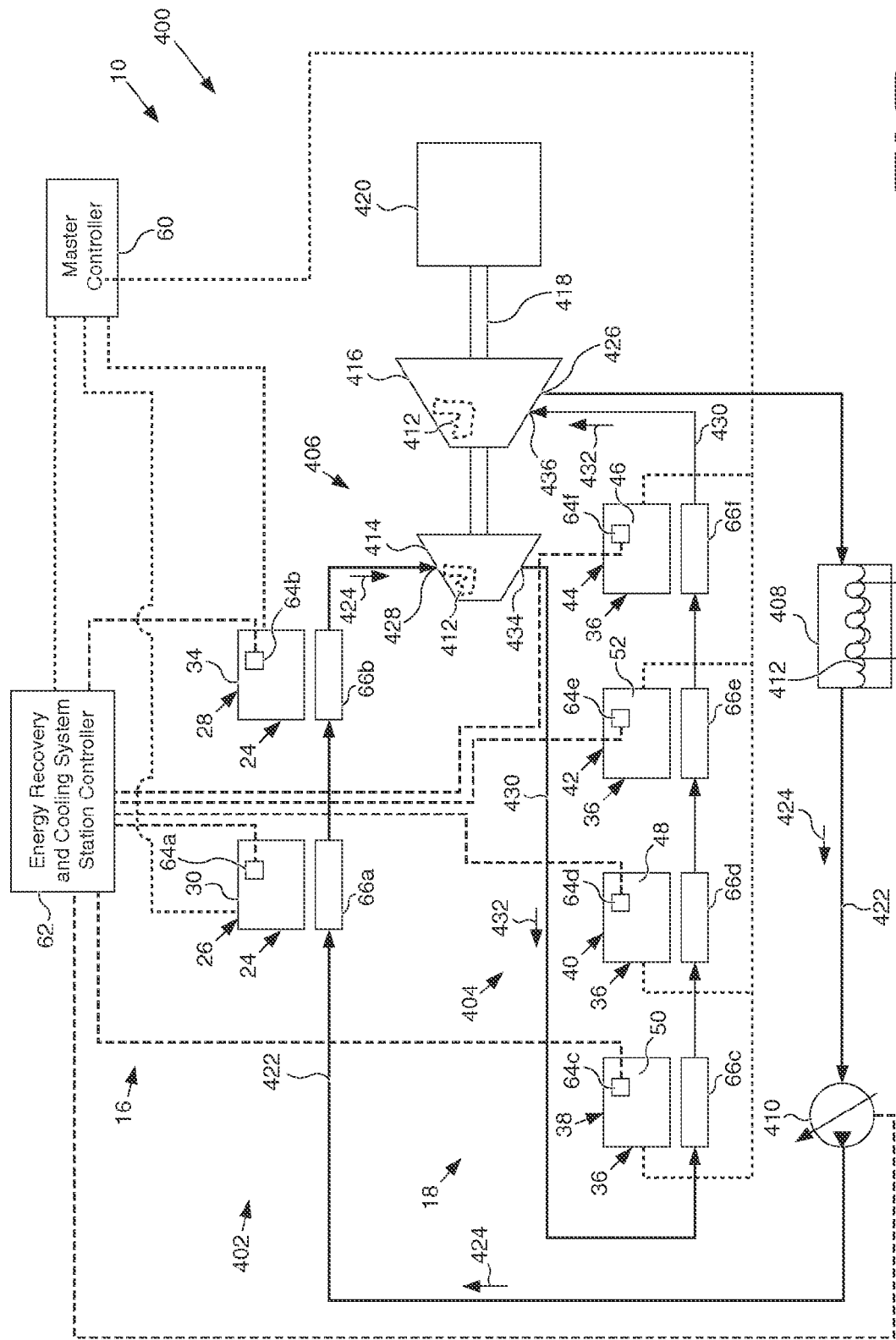
FIG. 7 is a schematic and diagrammatic illustration of another embodiment of the exemplary disclosed energy recovery and cooling system for the hybrid powertrain of the hybrid machine illustrated in FIG. 1.

FIG. 7 illustrates another embodiment of the energy recovery and cooling system 10 of the present disclosure. In particular, the energy recovery and cooling system 400 of FIG. 7 illustrates another embodiment of the energy recovery and cooling system 10 for the hybrid powertrain 14 of the hybrid machine 12 illustrated in FIG. 1. The exemplary energy recovery and cooling system 400 shown in FIG. 7 can be embodied as a fluidly integrated closed loop energy recovery and cooling circuit 402 configured to direct working fluid along and through a reheat circuit 404 included therein.

As shown in FIG. 7, the energy recovery and cooling system can include a turbine assembly 406, a condenser 408 and a pump 410, each operably connected in fluid communication and fluidly integrated into the energy recovery and cooling circuit 402 to operatively interact with working fluid 412 contained therein. The turbine assembly 406 can include two turbines, a high pressure turbine 414 and a low pressure turbine 416, which can be arranged in series and commonly attached to a turbine assembly output shaft 418 which can be operably and mechanically connected to transmit rotational mechanical energy to a power component 420. The energy recovery and cooling circuit 402 can also include a first or energy recovery and fluid delivery conduit 422 which can be configured to fluidly direct the working fluid 412 of the energy recovery and cooling circuit 402 along a first or energy recovery and fluid delivery flow path 424 which can extend from a first or upstream end 426 fluidly connected to receive working fluid 412 therein from the outlet or downstream end of the low pressure turbine 416 to a second or downstream end 428 of the energy recovery and fluid delivery conduit 422 fluidly connected to direct working fluid 412 into an inlet or upstream end of the high pressure turbine 414.

The energy recovery and fluid delivery conduit 422 can also be fluidly connected to direct the working fluid 412 sequentially and successively through the condenser 408, fluidly integrated and connected therein downstream of the upstream end 426 of the energy recovery and fluid delivery conduit 422, through the pump 410 fluidly integrated and connected in fluid communication via the energy recovery and fluid delivery conduit 422 downstream of the condenser 408, and adjacent to, along and/or through or otherwise in thermal proximity and communication with the internal combustion energy system components 24 which may generate heat and/or require cooling, positioned downstream of the pump 410 and upstream of the downstream end 428 of the energy recovery and fluid delivery conduit 422 and the high pressure turbine 414. Consistent with the foregoing embodiments, the energy recovery and fluid delivery conduit 422 can be fluidly connected to direct the working fluid 412 along the energy recovery and fluid delivery flow path 424 to sequentially and successively exchange thermal energy with the first internal combustion energy system component 26 and subsequently with the second internal combustion energy system 28 component, which can be via the associated heat exchangers 66a and 66b, such that the working fluid 412 may successively gain thermal energy and may be at a high pressure and heated from the first temperature (T1) to an elevated, higher second temperature (T2) to a vapor (whereas T2>T1). From the downstream-most, second internal combustion energy system component 26 which can be an exhaust manifold 34 or any other internal combustion energy system component 24 which can have a normal operating temperature equal to or higher than that of the upstream first internal combustion energy system component 26 according to the factors as provided herein, the energy recovery and fluid delivery conduit 422 can direct the working fluid 412 to the downstream end 428 of the energy recovery and fluid delivery flow path 424, and into the high pressure turbine 414. Subsequent to the expansion within the high pressure turbine 414 the working fluid 412 can be fluidly directed into and through the reheat circuit 404.

The reheat circuit 404 can include a second or reheat conduit 430, wherein the reheat conduit 430 can be configured to fluidly direct the working fluid 412 of the energy recovery and cooling circuit 402 along a second or reheat flow path 432 which can extend from a first or upstream end 434 fluidly connected to receive working fluid 412 therein from the outlet or downstream end of the high pressure turbine 414 to a second or downstream end 436 fluidly connected to direct working fluid 412 into an inlet or upstream end of the low pressure turbine 416. The reheat conduit 430 and reheat flow path 432 can additionally be fluidly connected to direct the working fluid 412 sequentially and successively adjacent to, along and/or through or otherwise in thermal proximity and communication with each of the individual electrical energy system components 36 of the electrical energy system 18 which may generate heat and/or require cooling to exchange thermal energy therewith, wherein the first, second, and third electrical energy system components 38, 40, 42, (and, in one example, the heat exchangers 66c, 66d, 66e thereof, respectively) can be positioned along the reheat flow path 432 upstream of the second, third, and fourth electrical energy system components 40, 42, 44, and, in one example, the heat exchangers 66d, 66e, 66f thereof, respectively. As provided by and consistent with the applicable portions of the foregoing embodiments, each downstream electrical energy system component 36, such as the second, third, and fourth electrical energy system components 40, 42, 44, respectively, can be any electrical energy system component 36, including but not limited to battery 50, electronics module 48, generator 52 or electrical motor 46, which can have a normal operating temperature equal to or higher than that of any and/or each upstream electrical energy system component 36, such as the respective upstream first, second, and third electrical energy system components 38, 40, 42, which can be any other electrical energy system component 36 based upon/defined by the foregoing factors as provided herein such that as the working fluid 412 passes along and through the reheat conduit 430 and reheat flow path 432 and exchanges thermal energy with each of the electrical energy system components 36, the working fluid 412 may successively gain thermal energy.

As such, and with this configuration, the reheat conduit 430 can direct the working fluid 412, which may be at a reduced pressure and an intermediate temperature (Ti) between the first temperature (T1) and the higher second temperature (T2) (whereas T2>Ti>T1) from the high pressure expansion through the high pressure turbine 414, along the reheat flow path 432 to sequentially and successively exchange thermal energy with the lowest to highest normal operating temperature electrical energy system components 36 such that the working fluid 412 can successively gain thermal energy and may be "re-heated" from the intermediate temperature (Ti) to the elevated, higher second temperature (T2) and in a vapor phase (whereas T2>Ti). From the downstream-most, highest temperature electrical energy system component 36, the reheat conduit 430 can direct the working fluid 412, which may be substantially at the higher temperature (T2) and lower pressure as provided above, to the downstream end 436 of the reheat flow path 432, and into the low pressure turbine 416. Subsequent to the expansion within the low pressure turbine 416, the working fluid 412 can be fluidly directed into the energy recovery and fluid delivery conduit 422 and through the energy recovery and cooling circuit 402 for another cycle as provided above.

Figure 8:
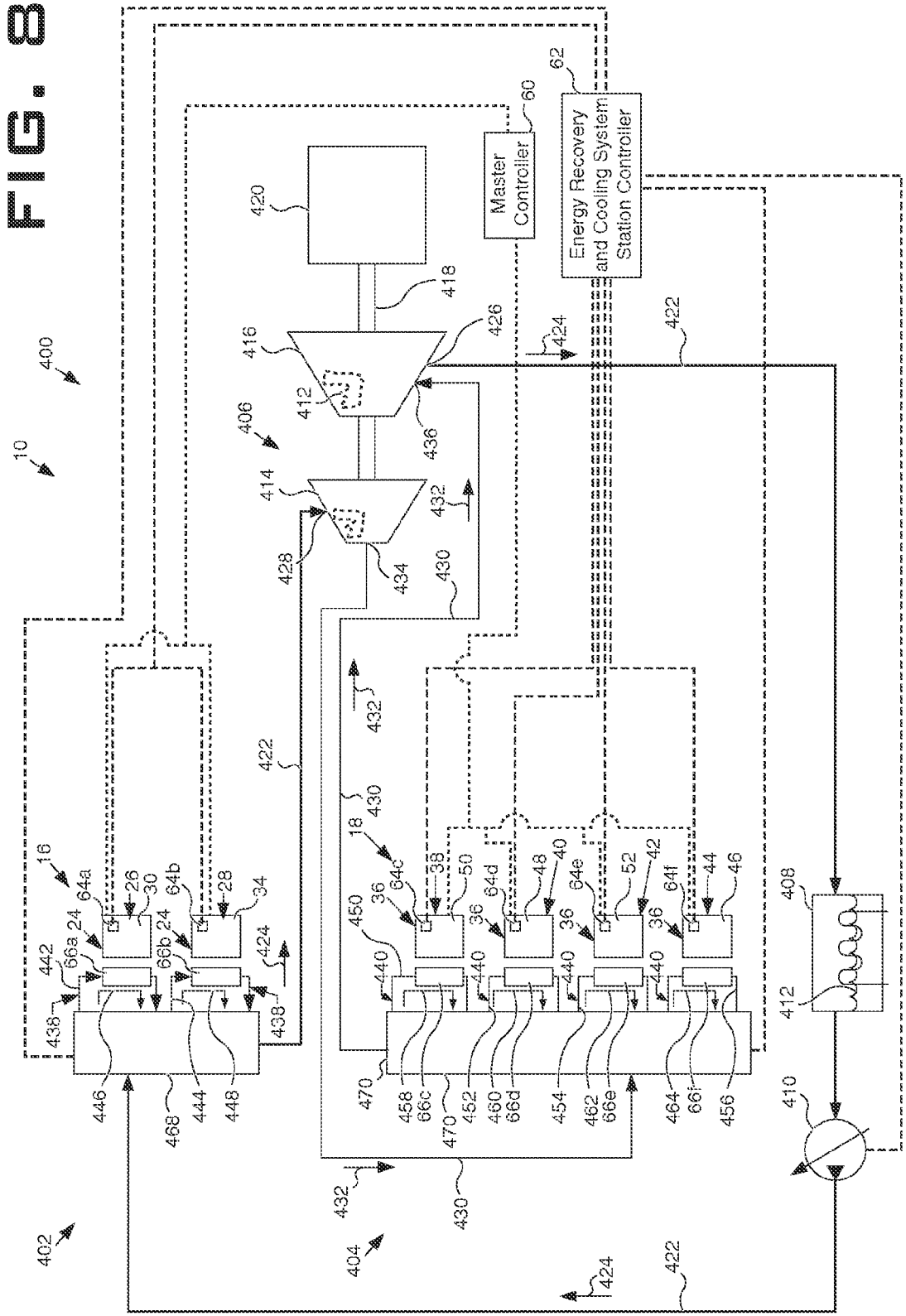
FIG. 8 is a schematic and diagrammatic illustration of an alternate embodiment of the exemplary disclosed energy recovery and cooling system illustrated in FIG. 7.

FIG. 8 illustrates an alternate embodiment or variant of the energy recovery and cooling system 400 and energy recovery and cooling circuit 402 thereof shown in FIG. 7.

As illustrated by the exemplary embodiment shown in FIG. 8, the energy recovery and fluid delivery conduit 422 can include a plurality of internal combustion energy system component conduits 438 and the reheat conduit 430 can include a plurality of electrical energy system component conduits 440 connected in fluid communication therewith such that the flow of working fluid 412 through the energy recovery and fluid delivery flow path 424 as well as the reheat flow path 432 can be controllably, selectively and/or sequentially directed to exchange thermal energy, extract heat, cool, and generate energy from each, any one or more and/or any combination and sequence of the internal combustion energy system components 24 and electrical energy system components 36, respectively.

In a manner substantially consistent with the embodiments shown in FIG. 3 and FIG. 6 and discussed above, the internal combustion energy system component conduits 438 can include a first internal combustion energy system component conduit 442 and a second internal combustion energy system component conduit 444 which can each fluidly direct the working fluid 412 along a first and second internal combustion energy system component flow path 446, 448 such that the working fluid 412 fluidly communicated therethrough can exchange thermal energy with the first and the second internal combustion energy system components 26, 28, respectively, which in one embodiment, can be via associated heat exchangers 66a and 66b, respectively. Similarly, the electrical energy system component conduits 440 can include a first, second, third, and fourth electrical energy system component conduit, 450, 452, 454, 456 each of which can fluidly direct the working fluid 412 along a first, second, third, and fourth electrical energy system component flow path, 458, 460, 462, 464 respectively, such that the second working fluid 412 fluidly communicated therethrough can exchange thermal energy with the first, second, third, and fourth electrical energy system components, 38, 40, 42, 44 respectively can be via the associated respective heat exchangers 66c, 66d, 66e, 66f.

In a manner substantially consistent with the embodiments, each of the internal combustion energy system component conduits 438 can be fluidly and operably connected to an internal combustion energy system valve assembly 468 which can be operably connected in fluid communication with the energy recovery and fluid delivery conduit 422 such that the flow of working fluid 412 fluidly communicated between the pump 410 and the high pressure turbine 414 can be fluidly directed through the internal combustion energy system valve assembly 468. Similarly, each of the electrical energy system component conduits 440 can be fluidly and operably connected to an electrical energy system valve assembly 470 which can be operably connected in fluid communication with the reheat conduit 430 such that the flow of working fluid 412 fluidly communicated between the high pressure turbine 414 and the low pressure turbine 416 can be fluidly directed through the electrical energy system valve assembly 470. Each of the internal combustion energy system valve assembly 468 and the electrical energy system valve assembly 470 can be configured such that the flow of working fluid 412 fluidly communicated therethrough can be controllably, selectively and/or sequentially directed through each, any one or more and/or any combination and sequence of the internal combustion energy system component conduits 438 and the electrical energy system component conduits 440, respectively, to exchange thermal energy, extract heat, cool, and generate energy from each, any one or more and/or any combination and sequence of the internal combustion energy system components 24 and the electrical energy system components 36, respectively, such that the working fluid 412 may gain thermal energy. Furthermore, each the internal combustion energy system valve assembly 468 and the electrical energy system valve assembly 470 can be electronically actuatable and electronically and controllably connected to the energy recovery and cooling system controller 62 such that the respective valve assemblies can be actuated to controllably, selectively and/or sequentially direct the flow working fluid 412 as provided above in response to one or more signals from the energy recovery and cooling system controller 62.

In a manner substantially consistent with the foregoing applicable embodiments, the energy recovery and cooling system controller 62 may receive one or more readings or signals from the temperature sensors 64 and/or the master controller 60 as provided herein of the temperature and/or activation and/or intensity of operation or actuation of each of the first, second, third, and/or fourth electrical energy system component 38, 40, 42, 44, as well as the first and/or second internal combustion energy system components 26, 28. In response, the energy recovery and cooling system controller 62 may transmit one or more internal combustion energy system valve assembly actuation signals, which can include one or more energy recovery and fluid delivery conduit flow path control signals to the internal combustion energy system valve assembly 468. In response to the one or more energy recovery and fluid delivery conduit flow path control signals, the internal combustion energy system valve assembly 468 may be actuated to direct the flow of working fluid 412 fluidly communicated through the energy recovery and fluid delivery conduit 422 between the pump 410 and the high pressure turbine 414 through each, any one or more and/or any combination and sequence of the internal combustion energy system component conduits 438 based upon the temperature and/or activation and/or intensity of operation or actuation (or inactivity) of each of the internal combustion energy system components 24 in a manner consistent with any of the foregoing embodiments.

In particular, in addition to sequentially and successively directing the working fluid 412 through any one or more or any combination of the internal combustion energy system component conduits 438 in order corresponding to the temperature and/or activation and/or intensity of operation or actuation of any one or more internal combustion energy system components 24, in response to the one or more internal combustion energy system valve assembly actuation signals, which can include one or more energy recovery and fluid delivery conduit flow path control signals, the internal combustion energy system valve assembly 468 may be actuated to direct the flow of working fluid 412 fluidly communicated through the energy recovery and fluid delivery conduit 422 between the pump 410 and the high pressure turbine 414 directly to any one or more internal combustion energy system components 24 (via the internal combustion energy system component conduits 438) having acute cooling needs and/or an operating temperature above a predefined threshold, and/or may divert or block the flow of working fluid 412 from being directed through any associated internal combustion energy system component conduits 438 of any such internal combustion energy system components 24 which may be inactive and or may have temperature reading or signal indicative of no thermal energy or activity.

In addition, the energy recovery and cooling system controller 62 may transmit one or more electrical energy system valve assembly actuation signals, which can include one or more reheat conduit flow path control signals to the electrical energy system valve assembly 470. In response to the one or more reheat conduit flow path control signals, the electrical energy system valve assembly 470 may be actuated to direct the flow of working fluid 412 fluidly communicated through the reheat conduit 430 between the high pressure turbine 414 and the low pressure turbine 416 through each, any one or more and/or any combination and sequence of the electrical energy system component conduits 440 based upon the temperature and/or activation and/or intensity of operation or actuation (or inactivity) of each of the electrical energy system components 36 in a manner consistent with any of the foregoing embodiments.

In particular, in addition to sequentially and successively directing the working fluid 412 through any one or more or any combination of the electrical energy system component conduits 440 in order corresponding to the temperature and/or activation and/or intensity of operation or actuation of any one or more electrical energy system components 36, in response to the one or more electrical energy system valve assembly actuation signals, which can include one or more reheat conduit flow path control signals, the electrical energy system valve assembly 470 may be actuated to direct the flow of working fluid 412 fluidly communicated through the reheat conduit 430 between the high pressure turbine 414 and the low pressure turbine 416 directly to any one or more electrical energy system components 36 (via the electrical energy system component conduits 440) having acute cooling needs and/or an operating temperature above a predefined threshold, and/or may divert or block the flow of working fluid 412 from being directed through any associated electrical energy system component conduits 440 of any such electrical energy system components 36 which may be inactive and or may have temperature reading or signal indicative of no thermal energy or activity.

Figure 9:
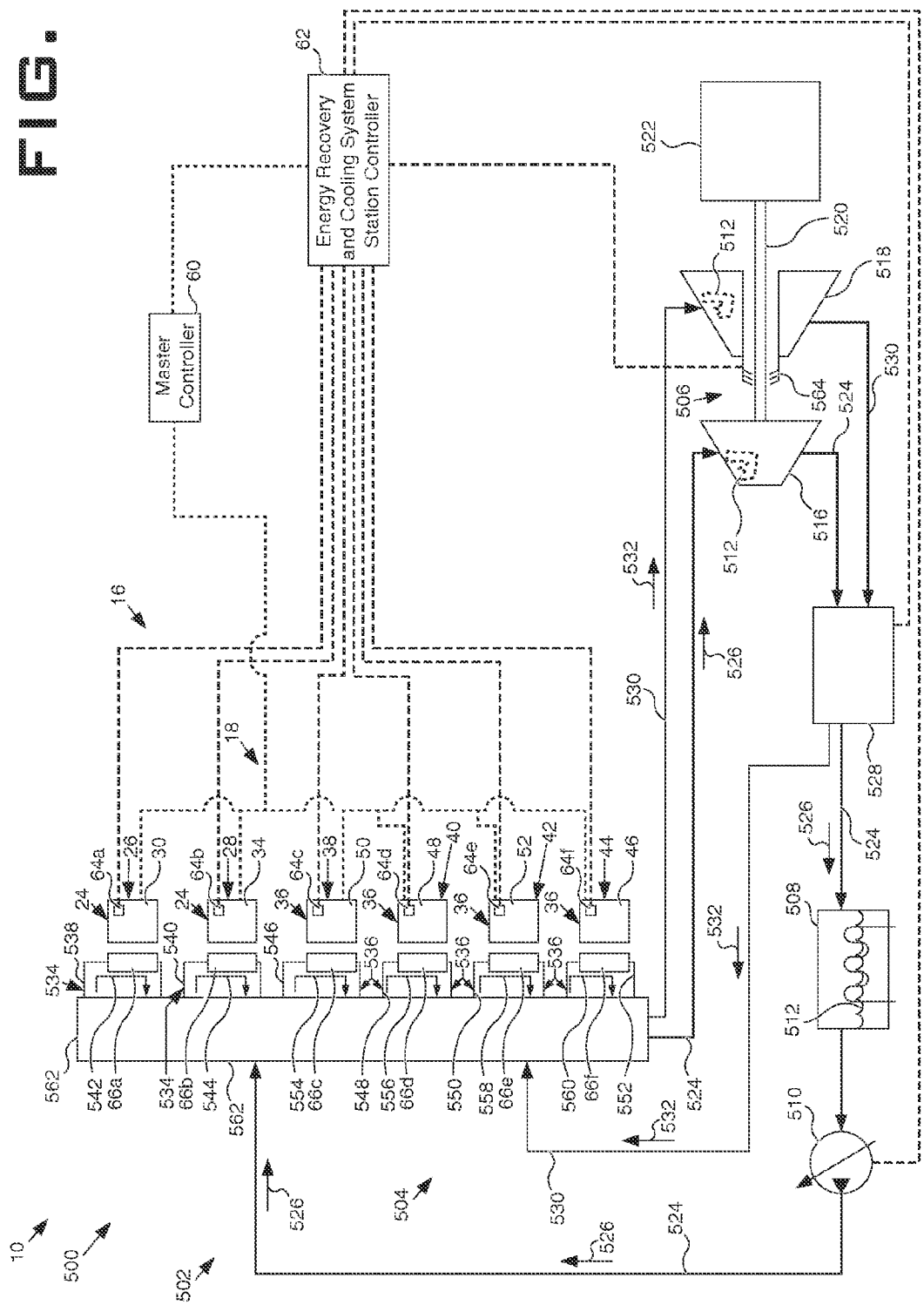
FIG. 9 is a schematic and diagrammatic illustration of another embodiment of the exemplary disclosed energy recovery and cooling system for the hybrid powertrain of the hybrid machine illustrated in FIG. 1.

FIG. 9 illustrates another embodiment of the energy recovery and cooling system 10 of the present disclosure. In particular, the energy recovery and cooling system 500 of FIG. 9 illustrates another embodiment of the energy recovery and cooling system 10 for the hybrid powertrain 14 of the hybrid machine 12 illustrated in FIG. 1. The exemplary energy recovery and cooling system 500 shown in FIG. 9 can be embodied as a fluidly integrated closed loop energy recovery and cooling circuit 502 configured to controllably, selectively and/or sequentially direct the flow of working fluid 512 through the energy recovery and cooling circuit 502 as well as a reheat circuit 504 included therein.

As shown in FIG. 9, the energy recovery and cooling system 500 can include a turbine assembly 506, a condenser 508 and a pump 510, each operably connected in fluid communication and fluidly integrated into the energy recovery and cooling circuit 502 to operatively interact with working fluid 512 contained therein. The turbine assembly 506 can include two turbines, a first turbine 516, which can be a high pressure turbine, and a second turbine 518, which can be a low pressure turbine. The first turbine 516 and second turbine 518 can be arranged in series and commonly attached to a turbine assembly output shaft 520 which can be operably and mechanically connected to transmit rotational mechanical energy to a power component 522. The energy recovery and cooling circuit 502 can also include a first or energy recovery and fluid delivery conduit 524 which can be configured to fluidly direct the working fluid 512 along a first or energy recovery and fluid delivery flow path 526. The energy recovery and fluid delivery conduit 524 and flow path 526 thereof can be fluidly connected to direct the working fluid 512 sequentially and successively through the condenser 508, fluidly connected to (via the energy recovery and fluid delivery conduit 524) and integrated downstream of the turbine assembly 506, through the pump 510 connected in fluid communication with (via the energy recovery and fluid delivery conduit 524) and integrated downstream of the condenser 508, and adjacent to, along and/or through or otherwise in thermal proximity and communication to exchange thermal energy with any one or more and/or any combination and sequence of the internal combustion energy system components 24 and/or electrical energy system components 36 which may generate heat and/or require cooling positioned downstream of the pump 510, and finally into and through the first turbine 516.

In one embodiment, from the first turbine 516, the working fluid 512 can be fluidly directed from energy recovery and fluid delivery conduit 524 into the reheat circuit 504, which can be via a first valve assembly 528. The reheat circuit 504 can include a reheat conduit 530, which can be fluidly connected to, in one embodiment, selectively, receive the working fluid 512 fluidly communicated through the energy recovery and fluid delivery conduit 524 downstream of the first turbine 516 and upstream of the condenser 508, which can be via the first valve assembly 528, and direct the working fluid 512 along a reheat flow path 532. In particular, the reheat conduit 530 can be fluidly connected to direct the working fluid 512 along the reheat flow path 532 such that the working fluid 512 is directed sequentially and successively adjacent to, along and/or through or otherwise in thermal proximity and communication to exchange thermal energy with any one or more and/or any combination and sequence of the internal combustion energy system components 24 and/or electrical energy system components 36 which may generate heat and/or require cooling, and subsequently through the second turbine 518, which can be a low pressure turbine, and back to the energy recovery and fluid delivery conduit 524, which can be via the first valve assembly 528.

In one embodiment, the energy recovery and cooling system 500 can include a plurality of internal combustion energy system component conduits 534 and electrical energy system component conduits 536 fluidly connected and integrated therein that the flow of working fluid 512 through both the energy recovery and fluid delivery flow path 526 as well as the reheat flow path 532 can be controllably, selectively and/or sequentially directed to exchange thermal energy with, extract heat, cool, and generate energy from each, any one or more and/or any combination and sequence of the internal combustion energy system components 24 and/or electrical energy system components 36.

The internal combustion energy system component conduits 534 can include a first and a second internal combustion energy system component conduit 538, 540 which can each fluidly direct the working fluid 512 along a first and second internal combustion energy system component flow path 542, 544, respectively, such that the working fluid 512 fluidly communicated therethrough can exchange thermal energy with the first and the second internal combustion energy system components 26, 28, respectively, which in one embodiment, can be via the associated respective heat exchangers 66a and 66b. Similarly, the electrical energy system component conduits 536 can include a first, second, third, and fourth electrical energy system component conduit 546, 548, 550, 552 each of which can fluidly direct the working fluid 512 along a first, second, third, and fourth electrical energy system component flow path, 554, 556, 558, 560, respectively, such that the second working fluid 512 fluidly communicated therethrough can exchange thermal energy with the first, second, third, and fourth electrical energy system components, 38, 40, 42, 44, respectively, which can be via associated heat exchangers 66.

Each of the internal combustion energy system component conduits 534 and the electrical energy system component conduits 536 can be fluidly and operably connected to an internal combustion and electrical energy system valve assembly 562 which can be operably connected in fluid communication with the energy recovery and fluid delivery conduit 524 and flow path 526 thereof such that the flow of working fluid 512 fluidly communicated therethrough between the pump 510 and the first turbine 516 can be fluidly directed through the internal combustion and electrical energy system valve assembly 562. The internal combustion and electrical energy system valve assembly 562 can also be operably connected in fluid communication with the reheat conduit 530 such that the flow of first working fluid 512 fluidly communicated through the reheat flow path 532 between the energy recovery and fluid delivery conduit 524 (and in one embodiment, the first valve assembly 528) and the second turbine 518 can additionally be fluidly directed through the internal combustion and electrical energy system valve assembly 562.

The internal combustion and electrical energy system valve assembly 562 can include one or more or a plurality of flow control valves and/or other flow control elements (not shown), or any other operable configuration such that the internal combustion and electrical energy system valve assembly 562 can be fluidly and operably connected and actuated to controllably, selectively and/or sequentially direct the flow of working fluid 512, fluidly communicated through the energy recovery and fluid delivery conduit 524 and flow path 526 thereof between the pump 510 and the first turbine 516, through each, any one or more and/or any combination and sequence of the first and/or second internal combustion energy system component conduits 538, 540, and/or the first, second, third, and/or fourth electrical energy system component conduits 546, 548, 550, 552 to exchange thermal energy, extract heat, cool, and generate energy from each, any one or more and/or any combination and sequence of the first and/or second internal combustion energy system components 26, 28, and/or the first, second, third, and/or fourth electrical energy system components 38, 40, 42, 44, respectively, such that the second working fluid 512 may gain thermal energy. In a similar manner, the internal combustion and electrical energy system valve assembly 562 can be fluidly and operably connected and actuated to controllably, selectively and/or sequentially direct the flow of working fluid 512, fluidly communicated through the reheat conduit 530 and reheat flow path 532 between the energy recovery and fluid delivery conduit 524 and the second turbine 518, through each, any one or more and/or any combination and sequence of the first and/or second internal combustion energy system component conduits 538, 540, and/or the first, second, third, and/or fourth electrical energy system component conduits 546, 548, 550, 552 to exchange thermal energy, extract heat, cool, and generate energy from each, any one or more and/or any combination and sequence of the first and/or second internal combustion energy system components 26, 28, and/or the first, second, third, and/or fourth electrical energy system components 38, 40, 42, 44, respectively, such that the second working fluid 512 may gain thermal energy. In one embodiment, the internal combustion and electrical energy system valve assembly 562 (and/or one or more of the foregoing included flow control elements thereof) can be electronically actuatable and electronically and controllably connected to the energy recovery and cooling system controller 62 such that the internal combustion and electrical energy system valve assembly 562 can be actuated to controllably, selectively and/or sequentially direct the flow of working fluid 512 as provided above in response to one or more signals from the energy recovery and cooling system controller 62.

In one embodiment, the energy recovery and cooling system 500 can be configured to selectively activate and deactivate the reheat circuit 504, as well as the flow of working fluid 512 therethrough, which in one embodiment, can be via the energy recovery and cooling system controller 62. In particular, in one example, the first valve assembly 528 can include one or more or a plurality of flow control valves and/or other flow control elements (not shown) which can be fluidly and operably connected and electronically actuatable to selectively direct the flow of working fluid 512 fluidly communicated through the energy recovery and fluid delivery conduit 524 from the first turbine 516 to the condenser 508 into the reheat circuit 504 in response to one or more signals from the energy recovery and cooling system controller 62, which in one embodiment, can include a reheat cycle activation signal. Additionally, in one embodiment, the second turbine 518, which can be a low pressure turbine, can be rotatably mounted on the turbine assembly output shaft 520 and selectively coupled or attached thereto via a clutch 564. In one example, the clutch 564 can be electronically actuatable and controllably connected to the energy recovery and cooling system controller 62, wherein the clutch 564 can be engaged to couple the second turbine 518 to the turbine assembly output shaft 520 in response to one or more signals from the energy recovery and cooling system controller 62, which in one embodiment, can include a reheat cycle activation signal.

In a manner substantially consistent with the foregoing applicable embodiments, the energy recovery and cooling system controller 62 may receive one or more readings or signals from the temperature sensors 64 and/or the master controller 60 as provided herein of the temperature and/or activation and/or intensity of operation or actuation of each of the first, second, third, and/or fourth electrical energy system component 38, 40, 42, 44, as well as the first and/or second internal combustion energy system components 26, 28. In response, the energy recovery and cooling system controller 62 may selectively activate and deactivate the reheat circuit 504 as provided above, and may transmit one or more internal combustion and electrical energy system valve assembly actuation signals, which can include one or more energy recovery and fluid delivery conduit flow path control signals, and additionally may include one or more reheat conduit flow path control signals to the internal combustion and electrical energy system valve assembly 562. In response to the one or more energy recovery and fluid delivery conduit flow path control signals, the internal combustion and electrical energy system valve assembly 562 may be actuated to direct the flow of working fluid 512 fluidly communicated through the energy recovery and fluid delivery conduit 524 between the pump 510 and the first turbine 516 through each, any one or more and/or any combination and sequence of the internal combustion internal combustion energy system component conduits 534 and electrical energy system component conduits 536 based upon the temperature and/or activation and/or intensity of operation or actuation (or inactivity) of each of the internal combustion energy system components 24 as well as the electrical energy system components 36 in a manner consistent with any of the foregoing embodiments.

In particular, in addition to sequentially and successively directing the working fluid 512 through each, any one or more and/or any combination and sequence of the internal combustion internal combustion energy system component conduits 534 and electrical energy system component conduits 536 in order corresponding to the temperature and/or activation and/or intensity of operation or actuation of any one or more of the internal combustion energy system components 24 as well as the electrical energy system components 36, in response to the one or more internal combustion and electrical energy system valve assembly actuation signals, which can include one or more energy recovery and fluid delivery conduit flow path control signals, the internal combustion and electrical energy system valve assembly 562 may be actuated to direct the flow of working fluid 512 fluidly communicated energy recovery and fluid delivery conduit 524 between the pump 510 and the first turbine 516 directly to any one or more internal combustion energy system components 24 and/or electrical energy system components 36 (via the associated respective internal combustion energy system component conduits 534 and electrical energy system component conduits 536) having acute cooling needs and/or an operating temperature above a predefined threshold, and/or may divert or block the flow of working fluid 512 from being directed through any associated internal combustion energy system component conduits 534 and electrical energy system component conduits 536 of any internal combustion energy system components 24 and/or electrical energy system components 36 which may be inactive and or may have temperature reading or signal indicative of no thermal energy or activity.

In a similar manner, in response to the one or more internal combustion and electrical energy system valve assembly actuation signals, which can one or more reheat conduit flow path control signals, the internal combustion and electrical energy system valve assembly 562 may be actuated to direct the flow of working fluid 512 fluidly communicated through the reheat conduit 530 between the energy recovery and fluid delivery conduit 524 and the second turbine 518 through each, any one or more and/or any combination and sequence of the internal combustion internal combustion energy system component conduits 534 and electrical energy system component conduits 536 in order corresponding to the temperature and/or activation and/or intensity of operation or actuation of any one or more of the internal combustion energy system components 24 as well as the electrical energy system components 36, and additionally may direct the flow of working fluid 512 directly to any one or more internal combustion energy system components 24 and/or electrical energy system components 36 (via the associated respective internal combustion energy system component conduits 534 and electrical energy system component conduits 536) having acute cooling needs and/or an operating temperature above a predefined threshold, and/or may divert or block the flow of working fluid 512 from being directed through any associated internal combustion energy system component conduits 534 and electrical energy system component conduits 536 of any internal combustion energy system components 24 and/or electrical energy system components 36 which may be inactive and or may have temperature reading or signal indicative of no thermal energy or activity.

FIG. 10 illustrates another embodiment of the energy recovery and cooling system 10 of the present disclosure. In particular, the energy recovery and cooling system 600 of FIG. 10 illustrates another embodiment of the energy recovery and cooling system 10 for the hybrid powertrain 14 of the hybrid machine 12 illustrated in FIG. 1. The exemplary energy recovery and cooling system 600 shown in FIG. 10 can be embodied as including a plurality of fluidly separate, closed loop individual hybrid powertrain component energy recovery and cooling circuits 602 each configured to individually, independently and separately exchange thermal energy, extract heat, cool, and generate energy from each internal combustion energy system component 24 and each electrical energy system component 36.

In particular, as shown in FIG. 10, each of the plurality of individual hybrid powertrain component energy recovery and cooling circuits 602 can include a condenser 604, a pump 606, and a turbine 608 operably and mechanically connected to a power component 610. As further shown in FIG. 10, each of the plurality of individual hybrid powertrain component energy recovery and cooling circuits 602 can also include a conduit 612 fluidly connected to direct working fluid 614 sequentially and successively through the turbine 608, the condenser 604, the pump 606 and adjacent to, along and/or through or otherwise in thermal proximity and communication to exchange thermal energy with one of each of the first internal combustion energy system component 26, the second internal combustion energy system component 28, the first electrical energy system component 38, the second electrical energy system component 40, the third electrical energy system component 42, and the fourth electrical energy system component 44, which can be via each associated respective heat exchanger 66a, 66b, 66c, 66d, 66e, 66f. As such, each one of the plurality of individual hybrid powertrain component energy recovery and cooling circuits 602 can be configured to individually, independently and separately exchange thermal energy, extract heat, cool, and generate energy from one of each of the internal combustion energy system components 26 and electrical energy system component 36 via expansion of each working fluid 614 through each turbine 608, as provided herein.

Consistent with the disclosure provided herein, the energy recovery and cooling system controller 62 can be connected in electronic communication to monitor, and/or receive signals from a plurality of temperature sensors 64 each operatively associated with each of the foregoing internal combustion energy system components 24 and electrical energy system components 36, and additionally can be connected in electronic communication to the master controller 60 to monitor and/or receive signals indicative of the monitoring, actuation, control and/or operation of the foregoing components and additional components and operation of the hybrid powertrain 14. In addition, in one embodiment, each pump 606 of each of the plurality of individual hybrid powertrain component energy recovery and cooling circuits 602 can be electronically actuatable, and in one example can additionally be an electronically controllable variable displacement pump. As such, in one embodiment, each pump 602 can furthermore be electronically and controllably connected to the energy recovery and cooling system controller 62 such that each pump 606 can be individually and selectively activated, which may be via an individual hybrid powertrain component energy recovery and cooling circuit activation signal from the energy recovery and cooling system controller 62. In particular, as provided herein, the energy recovery and cooling system controller 62 may receive one or more or a combination of electronic readings or signals including but not limited to those indicative of a high or increasing (or a low or decreasing) temperature of any one or more or any combination of the internal combustion energy system components 24 (including but not limited to the engine block 30 and/or exhaust manifold 34) and/or any one or more of the electrical energy system components 36 (including but not limited to the battery 50, electronics module 48, generator 52 and/or electrical motor 46).

Additionally, or alternatively, the energy recovery and cooling system controller 62 may receive one or more electronically monitored readings or transmitted signals indicative of the activation and/or increased intensity (or the deactivation or decreased intensity) of operation or actuation of any one or more or any combination of the foregoing internal combustion energy system components 24 and/or each electrical energy system components 36. In response, the energy recovery and cooling system controller 62 may electronically transmit one or more or a plurality of hybrid powertrain component energy recovery and cooling circuit activation signals to each to selectively activate, deactivate, and/or control any one or more and/or any combination of each pump 606 of each of the plurality of individual hybrid powertrain component energy recovery and cooling circuits 602 such that the working fluid 614 may be circulated and propelled through any one or more and/or any combination of the individual hybrid powertrain component energy recovery and cooling circuits 602 in response to any one or more of the operating temperature, heat production, and/or the cooling demands of any one or more of the internal combustion energy system components 24 and/or electrical energy system components 36 well as any one or more of the activation, control, and/or operation of the hybrid powertrain 14, as provided by and consistent with any of the applicable embodiments herein.

INDUSTRIAL APPLICABILITY

The energy recovery and cooling system of the present disclosure may be implemented and utilized with any of a variety of powertrains or similar power systems of any of a variety of hybrid machines in which an energy recovery and cooling system consistent with any one or more of the embodiments disclosed herein can be employed. In addition to further advantages both as stated herein as well as those as understood by one of ordinary skill of the art upon being provided with the benefit of the teachings of the present disclosure, the presently disclosed energy recovery and cooling system may provide increased energy recovery, as well as increased fuel efficiency and lower fuel consumption for a hybrid machine. Furthermore, the energy recovery and cooling system of the present disclosure may also provide more flexibility and responsiveness in extracting energy and meeting the cooling demands of system components. The presently disclosed energy recovery and cooling system may also facilitate the implementation and utilization of more compact and efficient electronic components which may be configured to produce a greater amount of power with a component characterized by a high packaging density. In addition, the energy recovery and cooling system of the present disclosure may provide a substantially net gain in energy recovery and fuel efficiency in addition to a reduction of fuel consumption which may be additive to and independent of other energy savings technologies and implementations without requiring significant energy demands or parasitic losses on the hybrid machine systems as a whole.

As provided herein, numerous additional factors can affect the power and energy demands, heat production, and, in particular instances, the cooling demands of any one or more components of a hybrid vehicle, including but not limited to the architecture, operative configuration, connections, and/or interactions between the internal combustion engine of the internal combustion energy system and the components of the electrical energy system. Such power and energy demands, heat production, and, the cooling demands may additionally be affected and/or defined by operation modes, activation, and the control of the internal combustion engine of the internal combustion energy system and the components of the electrical energy system and the division and/or path of energy between such components. Any one or more of the foregoing embodiments may present an energy recovery and cooling system which may not only be uniquely configured to a hybrid powertrain, but also may be responsive to the operation modes, energy state, path and intensity of electrical and mechanical energy through the hybrid powertrain as well as the corresponding control, operative state, and energy and heat (production, conversion, transmission, and/or dissipation) by and between internal combustion energy system and electrical energy system components which may generate heat and/or require cooling.

In particular, in one example, the hybrid powertrain 14 of the hybrid machine 12 as shown in FIG. 1 may include and be operated in an internal combustion engine drive operation mode, or internal combustion engine drive mode. In the internal combustion engine drive mode, the internal combustion engine 32 may be activated, which may be via one or more signals from the master controller 60, to deliver combustion-driven output power along a first or internal combustion energy path 95 through the internal combustion engine output shaft 54 and transmission 20 to the propulsion elements 22. While hybrid powertrain 14 of the hybrid machine 12 may be operated in internal combustion engine drive mode, the electrical energy system components 36 may be substantially inactive, or de-activated upon initiation, which may be via one or more signals to the electrical energy system components 36 from the master controller 60. As a result, in this mode, the engine block 30 and exhaust manifold 34 of the activated internal combustion engine 32 may be defined as primary, high intensity heat and energy sources.

In response to any one or more readings or signals from the temperature sensors 64 and/or the master controller 60 as provided herein which may be indicative of internal combustion engine drive mode, the energy recovery and cooling system controller 62 may transmit one or more actuation signals according to and consistent with any one or more of the applicable foregoing embodiments of the energy recovery and cooling system 10, and/or any one or more of the presently disclosed embodiments of the energy recovery and cooling system 10 may otherwise be operated as provided herein, such that working fluid (such as working fluid 218, first working fluid 314, working fluid 412, 512, 614 as provided herein) is fluidly routed and directed to exchange thermal energy, extract heat, cool, and generate energy from the internal combustion energy system components 24.

In particular, in response to the foregoing signals and the master controller 60 activating the internal combustion engine drive mode and actuating the hybrid powertrain 14 of the hybrid machine 12 to deliver combustion-driven output power along a first or internal combustion energy path 95, the energy recovery and cooling system controller 62 may transmit one or more electronic internal combustion energy system activation signals activating the internal combustion energy system circuit 250 of the energy recovery and cooling system 200 of FIGS. 2 and 3 and directing the working fluid 218 therethrough, including along the internal combustion energy system flow path 238. In the embodiments as shown in FIGS. 4-6, in response to the foregoing signals and the master controller 60 activating the internal combustion engine drive mode, the energy recovery and cooling system controller 62 may electronically transmit one or more internal combustion energy system circuit activation signals activating the internal combustion energy system circuit 304 such that the first working fluid 314 may be fluidly communicated along and throughout the internal combustion energy system flow path 318, and in one example, may additionally electronically transmit one or more electrical energy system circuit deactivation signals disengaging or deactivating the electrical energy system circuit 306 as well as the fluid communication of the second working fluid 326 throughout the electrical energy system flow path 330. Furthermore, in the exemplary embodiments of FIGS. 5 and 6, in response to the one or more internal combustion energy system circuit activation signals, the first working fluid 314 may additionally be fluidly communicated through the internal combustion energy system reheat flow path 358. In another embodiment as shown in FIG. 9, in response to the one or more signals indicative of the master controller 60 activating the internal combustion engine drive mode as provided above, the energy recovery and cooling system controller 62 may electronically transmit one or more internal combustion energy system activation signals, and in one embodiment, one or more internal combustion energy system reheat activation signals actuating the internal combustion and electrical energy system valve assembly 562 such that the working fluid 512 fluidly communicated through the energy recovery and fluid delivery flow path 526 and reheat flow path 532 is directed through the first and second internal combustion energy system component flow paths 542, 544. Additionally, embodiment as shown in FIG. 10, in response to the activation of the internal combustion engine drive mode, the energy recovery and cooling system controller 62 may electronically transmit one or more internal combustion energy system activation signals activating each individual hybrid powertrain component energy recovery and cooling circuit 602 associated with each activated internal combustion energy system component 24. As such, each of the foregoing flow paths and/or circuits can be defined and/or correspond to the internal combustion engine drive mode and the internal combustion energy path 95. The hybrid powertrain 14 of the hybrid machine 12 as shown in FIG. 1 may additionally include and be operated in an electrical energy system drive operation mode, or electrical energy system drive mode. In the electrical energy system drive mode, the master controller 60 may send one or more actuation signals to the electrical energy system components 36, including but not limited to the battery 50, electronics module 48, generator 52, or electrical motor 46, in addition to the various drivers and electronic controllers thereof, such that electrical energy may be controllably delivered from the battery 50 to the electrical motor 46 via one or more electronics module 48 and the electrical connections 59 therebetween to deliver electrical energy-driven output power along a second or electrical energy path 97 through the electrical motor shaft 58 and transmission 20 to the propulsion elements 22. While the hybrid powertrain 14 of the hybrid machine 12 is operated in electrical energy system drive mode, engine block 30 and exhaust manifold 34 of the internal combustion engine 32 may be substantially inactive, or de-activated upon initiation, which may be via one or more signals from the master controller 60. As a result, in this mode, one or more of the electrical energy system components 36 of the electrical energy system 18 may defined as primary, high intensity heat and energy sources.

In response to any one or more readings or signals from the from the temperature sensors 64 and/or the master controller 60 as provided herein which may be indicative of electrical energy system drive mode, the energy recovery and cooling system controller 62 may transmit one or more actuation signals according to and consistent with any one or more of the applicable foregoing embodiments of the energy recovery and cooling system 10, and/or any one or more of the presently disclosed embodiments of the energy recovery and cooling system 10 may otherwise be operated as provided herein, such that working fluid (such as working fluid 218, second working fluid 326, working fluid 412, 512, 612 as provided herein) is fluidly routed and directed to exchange thermal energy, extract heat, cool, and generate energy from the electrical energy system components 36. In particular, in response to the foregoing signals and the master controller 60 activating the electrical energy system drive mode and actuating the hybrid powertrain 14 of the hybrid machine 12 to deliver electrical energy-driven output power along a second or electrical energy path 97, the energy recovery and cooling system controller 62 may electronically transmit one or more electrical energy system activation signals activating the electrical energy system circuit 252 of the energy recovery and cooling system 200 of FIGS. 2 and 3 and directing the working fluid 218 therethrough, including along the electrical energy system flow path 244. In the embodiments as shown in FIGS. 4-6, in response to the foregoing signals and the master controller 60 activating the electrical energy system drive mode, the energy recovery and cooling system controller 62 may electronically transmit one or more electrical energy system circuit activation signals activating the electrical energy system circuit 306 such that the second working fluid 326 may be fluidly communicated along and throughout the electrical energy system flow path 330, and in one example, may additionally electronically transmit one or more internal combustion energy system circuit deactivation signals disengaging or deactivating the internal combustion energy system circuit 304 as well as the fluid communication of the first working fluid 314 throughout the internal combustion energy system flow path 318. Furthermore, in the exemplary embodiments of FIGS. 5 and 6, in response to the one or more electrical energy system circuit activation signals, the second working fluid 326 may additionally be fluidly communicated through the electrical energy system reheat flow path 370. In another embodiment as shown in FIG. 9, in response to the one or more signals indicative of the master controller 60 activating the electrical energy system drive mode as provided above, the energy recovery and cooling system controller 62 may electronically transmit one or more electrical energy system activation signals, and in one embodiment, one or more electrical energy system reheat activation signals actuating the internal combustion and electrical energy system valve assembly 562 such that the working fluid 512 fluidly communicated through the energy recovery and fluid delivery flow path 526 and reheat flow path 532 is directed through the first, second, third, and fourth electrical energy system component flow paths 554, 556, 558, 560. Additionally, embodiment as shown in FIG. 10, in response to the activation of the electrical energy system drive mode, the energy recovery and cooling system controller 62 may electronically transmit one or more electrical energy system activation signals activating each individual hybrid powertrain component energy recovery and cooling circuit 602 associated with each activated electrical energy system component 36. As such, each of the foregoing flow paths and/or circuits can be defined and/or correspond to the electrical energy system drive mode and the electrical energy path 97.

Furthermore, the hybrid powertrain 14 of the hybrid machine 12 as shown in FIG. 1 may include and be operated in a hybrid drive operation mode, or hybrid drive mode wherein both combustion-driven output power and electrical energy-driven output power may be delivered along the respective energy paths and through the transmission 20 to the propulsion elements 22. In particular, in the hybrid drive mode, the master controller 20 may send one or more actuation signals to the internal combustion engine 32 and the electrical energy system components 36, including but not limited to the battery 50, electronics module 48, generator 52, or electrical motor 46, in addition to the various drivers and electronic controllers thereof. In response to these signals, combustion-driven output power may be delivered both along the internal combustion energy path 95 to the propulsion elements 22 as provided above and additionally may be delivered from the internal combustion engine 32 to the generator 52 along a third or generator energy path 99 through a generator shaft 56 and subsequently through the electrical energy path 97 to the propulsion elements 22, as provided above. As a result, in this mode, any one or more of the electrical energy system components 36 of the electrical energy system 18 and/or any one or more of the internal combustion energy system components 24 of the internal combustion energy system 16 may defined as primary, high intensity heat and energy sources based upon numerous factors including but not limited to a variety of instantaneous operating states, conditions, and controls of the hybrid powertrain 14. In response, the energy recovery and cooling system controller 62 may transmit one or more actuation signals according to and consistent with any one or more of the applicable foregoing embodiments of the energy recovery and cooling system 10 as illustrated in FIGS. 2-10, and/or any one or more of the presently disclosed embodiments of the energy recovery and cooling system 10 as illustrated in FIGS. 2-10 may otherwise be operated as provided herein, such that working fluid (such as working fluid 218, second working fluid 326, working fluid 412, 512, 612 as provided herein) is fluidly routed and directed to exchange thermal energy, extract heat, cool, and generate energy from any one or more of the electrical energy system components 36 of the electrical energy system 18 and/or any one or more of the internal combustion energy system components 24 of the internal combustion energy system 16 which may defined as high intensity heat and energy sources.

In particular, the embodiments as shown in FIGS. 2 and 3, in response to the foregoing signals and the master controller 60 activating the hybrid drive mode and actuating the hybrid powertrain 14 of the hybrid machine 12 wherein output power may be delivered along any one or more of the internal combustion energy path 95, the electrical energy path 97 and the generator energy path 99, the energy recovery and cooling system controller 62 may transmit one or more electronic internal combustion energy system activation signals and one or more electrical energy system activation signals to selectively activate the internal combustion energy system circuit 250 and the electrical energy system circuit 252 to exchange thermal energy, extract heat, cool, and generate energy from the internal combustion energy system components 24 of the internal combustion energy system 16 or the electrical energy system components 36 which may defined as high intensity heat and energy sources. In the embodiments as shown in FIGS. 4-6, in response to the foregoing signals and the master controller 60 activating the hybrid drive mode, the energy recovery and cooling system controller 62 may electronically transmit one or more internal combustion energy system circuit activation signals activating the internal combustion energy system circuit 304 and/or may electronically transmit one or more electrical energy system circuit activation signals activating the electrical energy system circuit 306 to exchange thermal energy, extract heat, cool, and generate energy from the internal combustion energy system components 24 and/or the electrical energy system components 36 which may defined as primary, high intensity heat and energy sources based upon the operation of the hybrid machine 12 in the hybrid drive mode. In the embodiment as shown in FIG. 10, in response to the foregoing signals and the master controller 60 activating the hybrid drive mode, the energy recovery and cooling system controller 62 may electronically transmit one or more internal combustion energy system activation signals and/or one or more electrical energy system activation signals activating each individual hybrid powertrain component energy recovery and cooling circuit 602 to exchange thermal energy, extract heat, cool, and generate energy from the internal combustion energy system components 24 and/or the electrical energy system components 36 based upon the operation of the hybrid machine 12 in the hybrid drive mode.

In the exemplary embodiment of FIG. 3, the energy recovery and cooling system controller 62 may additionally transmit one or more internal combustion energy system valve assembly actuation signals, which can include one or more internal combustion energy system conduit flow path control signals to the internal combustion energy system valve assembly 268, or may transmit one or more electrical energy system valve assembly actuation signals, which can include one or more electrical energy system conduit flow path control signals, to the electrical energy system valve assembly 288 to exchange thermal energy, extract heat, cool, and generate energy from each, any one or more and/or any combination and sequence of the individual internal combustion energy system components 24 or the individual electrical energy system components 36 in response to, in part, the operating temperature, heat production, and/or the cooling demands of any one or more of the internal combustion energy system components 24 and electrical energy system components 36 based upon the operation of the hybrid machine 12 in the hybrid drive mode, consistent with the foregoing.

In a substantially similar manner and as provided above with respect to the embodiments of FIGS. 6, 8 and 9, the energy recovery and cooling system controller 62 may receive one or more readings or signals from the temperature sensors 64 and/or the master controller 60 as provided herein of the temperature and/or activation and/or intensity of operation or actuation of each of the first, second, third, and/or fourth electrical energy system component 38, 40, 42, 44, as well as the first and/or second internal combustion energy system components 26, 28 during operation of the hybrid machine 12 in the hybrid drive mode. In response, the energy recovery and cooling system controller 62 may transmit one or more internal combustion energy system valve assembly actuation signals and/or one or more electrical energy system valve assembly actuation signals, which can include one or more internal combustion energy system conduit flow path control signals and reheat conduit flow path control signals and/or one or more electrical energy system conduit flow path control signals and reheat conduit flow path control signals to each respective internal combustion energy system valve assembly 382, 468 and each respective electrical energy system valve assembly 394, 470, and with respect to FIG. 9, may transmit one or more energy recovery and fluid delivery conduit flow path control signals and one or more reheat conduit flow path control signals to the internal combustion and electrical energy system valve assembly 562. With this configuration, and in response to the foregoing signals, the foregoing valve assemblies can exchange thermal energy, extract heat, cool, and generate energy from each, any one or more and/or any combination and sequence of the individual internal combustion energy system components 24 and/or the individual electrical energy system components 36 based upon the temperature and/or activation and/or intensity of operation or actuation (or inactivity) and/or cooling needs of each of the components during operation of the hybrid machine 12 in the hybrid drive mode.

Additionally, any one or more or each of the internal combustion engine drive mode, electrical energy system drive mode, and or the hybrid drive mode of the hybrid powertrain 14 of the hybrid machine 12 as shown in FIG. 1 may include and be operated in numerous additional modes including but not limited to a retarding mode and/or a regenerative braking mode, wherein rotational energy may be directed from the propulsion elements 22 to the electrical energy system 18 along the electrical energy path 97 and may be dissipated as or converted to electrical energy by a resistor grid included in an electronics module 48, or utilized to charge a battery 50, respectively. Furthermore, internal combustion engine drive mode and or any of the other foregoing modes may include or be operated in a hybrid-assist mode, wherein depending on factors including but not limited to a variety of changing or instantaneous operating states, conditions, and controls of the hybrid powertrain 14, the hybrid-assist mode may be activated wherein electrical energy-driven output power from the electrical energy system 18 along the electrical energy path 97 may be utilized to assist, supplement, or in place of combustion-driven output power from the internal combustion energy system 16 along the internal combustion energy path 95. As a result, in any one of the foregoing modes and depending upon a variety of changing or instantaneous operating states, conditions, and controls of the hybrid powertrain 14 as provided above, any one or more or any combination of the electrical energy system components 36 of the electrical energy system 18 and/or the internal combustion energy system components 24 of the internal combustion energy system 16 may defined as primary, high intensity heat and energy sources.

Consequently, the energy recovery and cooling system controller 62 may receive any one or more readings or signals from the from the temperature sensors 64 and/or the master controller 60 as provided herein which may be indicative of a hybrid drive operation mode, a retarding mode, a regenerative braking mode, a hybrid-assist mode, or any other mode wherein any one or more or any combination of the electrical energy system components 36 of the electrical energy system 18 and/or the internal combustion energy system components 24 of the internal combustion energy system 16 may be defined as primary, high intensity heat and energy sources which may depend upon the foregoing factors. In response, the energy recovery and cooling system controller 62 may transmit one or more actuation signals according to and consistent with any one or more of the applicable foregoing embodiments of the energy recovery and cooling system 10, and/or any one or more of the presently disclosed embodiments of the energy recovery and cooling system 10 may otherwise be operated as provided herein, such that working fluid (including any one or more of working fluid 218, first working fluid 314, second working fluid 326, working fluid 412, 512, 612 as provided herein) may be fluidly routed and directed to exchange thermal energy, extract heat, cool, and generate energy from each, any one or more and/or or any combination and sequence of the individual internal combustion energy system components 24 and/or the individual electrical energy system components 36 in response to any one or more of the operating temperature, heat production, and/or the cooling demands of any one or more and/or or any combination of the internal combustion energy system components 24 and/or electrical energy system components 36 well as any one or more of the activation, control, and/or operation of the hybrid powertrain 14, as provided by and consistent with any of the applicable embodiments herein.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An energy recovery and cooling system for a hybrid machine, comprising:
    an energy recovery and cooling circuit including an internal combustion energy system circuit and an electrical energy system circuit;
    the internal combustion energy system circuit including a first pump, a first condenser, a first turbine, and an internal combustion energy system flow path, the internal combustion energy system flow path connected in fluid communication with the first pump, the first condenser, and the first turbine;
    the internal combustion energy system flow path being in thermal communication with one or more internal combustion energy system components of the hybrid machine;
    the electrical energy system circuit including a second pump, a second condenser, a second turbine, and an electrical energy system flow path, the electrical energy system flow path connected in fluid communication with the second pump, the second condenser, and the second turbine; and
    the electrical energy system flow path being in thermal communication with one or more electrical energy system components of the hybrid machine, wherein the electrical energy system circuit is configured to selectively direct a working fluid in thermal communication with the one or more of the electrical energy system components of the hybrid machine in response to an operating temperature of each of the one or more electrical energy system components.

2. The energy recovery and cooling system of claim 1 wherein the energy recovery and cooling circuit is configured to selectively activate the internal combustion energy system circuit and the electrical energy system circuit.

3. The energy recovery and cooling system of claim 2 wherein the internal combustion energy system circuit is activated in response to the activation of an internal combustion engine drive mode of the hybrid machine, the internal combustion engine drive mode of the hybrid machine configured to deliver combustion-driven output power along an internal combustion energy path of a powertrain of the hybrid machine.

4. The energy recovery and cooling system of claim 2 wherein the electrical energy system circuit is activated in response to the activation of an electrical energy system drive mode of the hybrid machine, the electrical energy system drive mode of the hybrid machine configured to deliver electrical energy-driven output power along an electrical energy path of a powertrain of the hybrid machine.

5. The energy recovery and cooling system of claim 2 wherein at least one of the internal combustion energy system circuit and the electrical energy system circuit is activated in response to the activation of a hybrid drive mode of the hybrid machine, the hybrid drive mode of the hybrid machine configured to deliver at least one of combustion-driven output power along an internal combustion energy path of a powertrain of the hybrid machine, electrical energy-driven output power along an electrical energy path of the powertrain of the hybrid machine, and output power along a generator energy path of the powertrain of the hybrid machine.

* * * * *